US010235644B2

(12) United States Patent
Reineccius et al.

(10) Patent No.: US 10,235,644 B2
(45) Date of Patent: *Mar. 19, 2019

(54) RETAIL POINT SEED TREATMENT SYSTEMS AND METHODS

(71) Applicant: BAYER CROPSCIENCE LP, Research Triangle Park, NC (US)

(72) Inventors: Greg A. Reineccius, Eden Prairie, MN (US); Jaco Ernest Van Der Westhuizen, Lakeville, MN (US); Alan W. Geiss, Kansas City, MO (US); Bradley W. May, Cary, NC (US); Tharacad S. Ramanarayanan, Cary, NC (US); Marc Jean-Marie Andrieux, Chapel Hill, NC (US)

(73) Assignee: BAYER CROPSCIENCE LP, Research Triangle, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,147

(22) Filed: Feb. 13, 2017

(65) Prior Publication Data

US 2017/0185062 A1 Jun. 29, 2017
US 2019/0049918 A9 Feb. 14, 2019

Related U.S. Application Data

(63) Continuation of application No. 13/993,041, filed as application No. PCT/US2011/064030 on Dec. 8,
(Continued)

(51) Int. Cl.
*G06Q 10/06* (2012.01)
*G06Q 10/08* (2012.01)
*G05B 19/18* (2006.01)

(52) U.S. Cl.
CPC ......... *G06Q 10/0631* (2013.01); *G05B 19/18* (2013.01); *G06Q 10/087* (2013.01); *G05B 2219/32287* (2013.01)

(58) Field of Classification Search
None
See application file for complete search history.

(56) References Cited

U.S. PATENT DOCUMENTS

| 1,545,480 A | 7/1925 | Boyle |
| 2,105,266 A | 1/1938 | Rendall |

(Continued)

FOREIGN PATENT DOCUMENTS

| CL | 0671-1992 | 6/1992 |
| CL | 38436 | 9/1992 |

(Continued)

OTHER PUBLICATIONS

GLCPS Gustafson Logic Controlled Proportioning System; 48 pages; Feb. 27, 2004.

(Continued)

*Primary Examiner* — Mandy C Louie
(74) *Attorney, Agent, or Firm* — McBee Moore Woodward & Vanik IP, LLC; Susan McBee

(57) ABSTRACT

An automated seed treatment system is adapted for on-site operation at a retail seed distributor. A sealed seed-treater vessel is configured to apply a plurality of chemical treatments to a batch of seed based on a seed treatment recipe. A programmable system controller is electrically coupled to a pump controller of each of a plurality of pump-stations. The programmable system controller is configured to receive a material transfer indication from each of the plurality of pump-stations and issue commands to the pump controller of each pump-station in response to the seed treatment recipe. The programmable system controller is (Continued)

configured to collect operational data representing at least consumption of chemical from the chemical container at each of the pump-stations based on the corresponding material transfer indication during seed treatment and to provide the operational data to a remotely hosted information system located remotely from the site of the retail seed distributor and accessible to at least one third party that is distinct from the retail seed distributor.

19 Claims, 25 Drawing Sheets

Related U.S. Application Data 2011, now Pat. No. 9,959,511, which is a continuation-in-part of application No. 13/314,148, filed on Dec. 7, 2011, now Pat. No. 9,861,027.

(60) Provisional application No. 61/421,030, filed on Dec. 8, 2010, provisional application No. 61/469,432, filed on Mar. 30, 2011, provisional application No. 61/469,370, filed on Mar. 30, 2011, provisional application No. 61/553,711, filed on Oct. 31, 2011, provisional application No. 61/553,692, filed on Oct. 31, 2011.

(56) References Cited

U.S. PATENT DOCUMENTS

| | | | |
|---|---|---|---|
| 2,416,725 A | 3/1947 | Williamson | |
| 2,502,809 A | 4/1950 | Vogelsang | |
| 2,673,024 A | 3/1954 | Kuss | |
| 2,925,197 A | 2/1960 | Frebel | |
| 3,348,738 A | 10/1967 | Hertlein | |
| 3,425,501 A | 2/1969 | Ganko | |
| 3,638,833 A | 2/1972 | Lucas | |
| 3,918,587 A * | 11/1975 | Drew, Jr. | A22C 21/0053 |
| | | | 177/210 R |
| 4,040,389 A | 8/1977 | Walters | |
| 4,045,004 A | 8/1977 | Berger | |
| 4,108,574 A | 8/1978 | Bartley et al. | |
| 4,208,954 A | 6/1980 | Chase | |
| 4,247,021 A | 1/1981 | Renier et al. | |
| 4,254,805 A | 3/1981 | Reeder | |
| 4,272,824 A | 6/1981 | Lewinger et al. | |
| 4,310,562 A | 1/1982 | Melliger | |
| 4,332,345 A | 6/1982 | Moran | |
| 4,361,232 A | 11/1982 | Olmsted | |
| 4,440,315 A | 4/1984 | Slobodnik | |
| 4,459,028 A | 7/1984 | Bruder et al. | |
| 4,465,017 A | 8/1984 | Simmons | |
| 4,494,619 A | 1/1985 | Matsuno | |
| 4,498,783 A | 2/1985 | Rudolph | |
| 4,500,038 A | 2/1985 | De Ferrari et al. | |
| 4,527,716 A | 7/1985 | Haas et al. | |
| 4,534,430 A | 8/1985 | Steel | |
| 4,544,279 A | 10/1985 | Rudolph | |
| 4,563,739 A | 1/1986 | Gerpheide et al. | |
| 4,579,252 A | 4/1986 | Wilson et al. | |
| 4,650,097 A | 3/1987 | Hagihara et al. | |
| 4,657,773 A | 4/1987 | Mueller | |
| 4,662,409 A | 5/1987 | Egli | |
| 4,689,249 A | 8/1987 | Thygesen | |
| 4,813,503 A | 3/1989 | Douglas et al. | |
| 4,846,345 A | 7/1989 | Hamuro et al. | |
| 4,863,277 A | 9/1989 | Neal et al. | |
| 4,936,978 A | 6/1990 | Bortnikov et al. | |
| 4,961,533 A | 10/1990 | Teller et al. | |
| 4,987,850 A | 1/1991 | McCracken | |
| 4,993,316 A * | 2/1991 | Greer | A01C 1/02 |
| | | | 99/487 |
| 5,040,699 A | 8/1991 | Gangemi | |
| 5,087,475 A * | 2/1992 | Bazin | A01C 1/06 |
| | | | 118/303 |
| 5,197,374 A | 3/1993 | Fond | |
| D337,774 S | 7/1993 | Schillinger | |
| 5,234,127 A | 8/1993 | Singer et al. | |
| 5,240,324 A | 8/1993 | Phillips et al. | |
| 5,242,702 A | 9/1993 | Fond | |
| 5,255,819 A | 10/1993 | Peckels | |
| 5,285,925 A | 2/1994 | Leight | |
| 5,343,799 A | 9/1994 | Fond | |
| 5,400,921 A | 3/1995 | Smith, Jr. et al. | |
| 5,402,707 A | 4/1995 | Fond et al. | |
| 5,405,053 A | 4/1995 | Zublin | |
| 5,433,335 A | 7/1995 | Raudalus et al. | |
| 5,527,107 A | 6/1996 | Weibel et al. | |
| 5,551,492 A | 9/1996 | Rack et al. | |
| 5,567,238 A | 10/1996 | Long, Jr. et al. | |
| 5,568,882 A | 10/1996 | Takacs | |
| 5,603,430 A | 2/1997 | Loehrke et al. | |
| 5,606,094 A | 2/1997 | Besnier | |
| 5,632,818 A | 5/1997 | Toyoda et al. | |
| 5,632,819 A | 5/1997 | Geissler | |
| 5,638,519 A | 6/1997 | Haluska | |
| 5,656,316 A | 8/1997 | Fond et al. | |
| 5,712,990 A | 1/1998 | Henderson | |
| 5,769,276 A | 6/1998 | Alexander | |
| 5,863,277 A | 1/1999 | Melbourne | |
| 5,884,300 A | 3/1999 | Brockman | |
| 5,891,246 A | 4/1999 | Lund | |
| 5,894,111 A | 4/1999 | Kawanishi | |
| 5,897,899 A | 4/1999 | Fond | |
| 5,910,646 A | 6/1999 | Kawanishi | |
| 5,910,776 A | 6/1999 | Black | |
| 5,974,230 A | 10/1999 | Jenkins | |
| 5,983,960 A | 11/1999 | Haugh | |
| 6,021,443 A | 2/2000 | Bracho et al. | |
| 6,092,726 A | 7/2000 | Toussant et al. | |
| 6,097,995 A | 8/2000 | Tipton et al. | |
| 6,167,679 B1 | 1/2001 | Horton-Steidle et al. | |
| 6,186,194 B1 | 2/2001 | Poupon | |
| 6,202,346 B1 | 3/2001 | Lyons et al. | |
| 6,209,259 B1 | 4/2001 | Madigan et al. | |
| 6,253,928 B1 | 7/2001 | Weber | |
| 6,257,447 B1 | 7/2001 | Schlienger et al. | |
| 6,286,711 B1 | 9/2001 | Fukuda et al. | |
| 6,293,318 B1 | 9/2001 | Schmidt et al. | |
| 6,331,210 B1 | 12/2001 | Dodd | |
| 6,412,661 B1 | 7/2002 | Hannah, Sr. | |
| 6,450,406 B2 | 7/2002 | Brown | |
| 6,472,615 B1 | 10/2002 | Carlson | |
| 6,551,402 B1 | 4/2003 | Renyer et al. | |
| 6,560,509 B2 | 5/2003 | Williams et al. | |
| 6,564,999 B1 | 5/2003 | Saveliev et al. | |
| 6,572,016 B2 | 6/2003 | Saveliev et al. | |
| 6,582,516 B1 | 6/2003 | Carlson | |
| 6,615,092 B2 | 9/2003 | Bickley et al. | |
| 6,666,573 B2 | 12/2003 | Grassi | |
| 6,675,728 B2 | 1/2004 | Lee et al. | |
| 6,684,119 B2 | 1/2004 | Burnard et al. | |
| 6,686,466 B2 | 2/2004 | Zhao et al. | |
| 6,711,798 B2 | 3/2004 | Sanders et al. | |
| 6,769,462 B2 | 8/2004 | Larson | |
| 6,772,944 B2 | 8/2004 | Brown | |
| 6,783,082 B2 | 8/2004 | Renyer et al. | |
| 6,796,504 B2 | 9/2004 | Robinson | |
| 6,799,503 B2 | 10/2004 | Kollep et al. | |
| 6,806,429 B2 | 10/2004 | Carlson | |
| 6,816,746 B2 | 11/2004 | Bickley et al. | |
| 6,816,905 B1 | 11/2004 | Sheets et al. | |
| 6,843,415 B2 | 1/2005 | Vogler | |
| 6,907,741 B2 | 6/2005 | Kateman | |
| 6,953,069 B2 | 10/2005 | Galomb | |
| 6,968,876 B2 | 11/2005 | Yacko et al. | |
| 6,996,538 B2 | 2/2006 | Lucas | |
| 7,009,519 B2 | 3/2006 | Leonard et al. | |
| 7,020,680 B2 | 3/2006 | Defossé | |
| 7,053,773 B2 | 5/2006 | McGarry et al. | |
| 7,071,825 B2 | 7/2006 | VoBa | |
| 7,082,970 B2 | 8/2006 | Bartholomew et al. | |

(56) References Cited

U.S. PATENT DOCUMENTS

| | | | |
|---|---|---|---|
| 7,083,093 B1 | 8/2006 | Brown | |
| 7,096,161 B2 | 8/2006 | Smith et al. | |
| 7,137,419 B1 | 11/2006 | Reeves | |
| 7,156,259 B2 | 1/2007 | Bethuy et al. | |
| 7,224,273 B2 | 5/2007 | Forster | |
| 7,225,052 B2 | 5/2007 | Foote et al. | |
| 7,233,241 B2 | 6/2007 | Overhultz et al. | |
| 7,255,003 B2 | 8/2007 | Schneiter | |
| 7,275,568 B2 | 10/2007 | Fredette et al. | |
| 7,278,571 B2 | 10/2007 | Schmidtberg et al. | |
| 7,292,993 B2 | 11/2007 | Uzzo et al. | |
| 7,298,330 B2 | 11/2007 | Forster et al. | |
| 7,299,981 B2 | 11/2007 | Hickle et al. | |
| 7,385,510 B2 | 6/2008 | Childress et al. | |
| 7,406,439 B2 | 7/2008 | Bodin et al. | |
| 7,513,425 B2 | 4/2009 | Chung | |
| 7,522,973 B1 | 4/2009 | Foote et al. | |
| 7,542,926 B2 | 6/2009 | Arisman | |
| 7,546,256 B2 | 6/2009 | Hillam et al. | |
| 7,557,707 B2 | 7/2009 | Kumar et al. | |
| 7,559,483 B2 | 7/2009 | Hickle et al. | |
| 7,573,395 B2 | 8/2009 | Morrison et al. | |
| 7,574,385 B2 | 8/2009 | Hillam et al. | |
| 7,640,194 B2 | 11/2009 | Bodin et al. | |
| 7,630,923 B2 | 12/2009 | Harada et al. | |
| 7,640,755 B1 | 1/2010 | Kateman | |
| 7,650,298 B2 | 1/2010 | Godlewski | |
| 7,650,568 B2 | 1/2010 | Williamson et al. | |
| 7,735,365 B2 | 6/2010 | Crain et al. | |
| 7,743,699 B1* | 6/2010 | Freeman | A01F 15/0816 100/73 |
| 7,750,817 B2 | 7/2010 | Teller | |
| 7,762,714 B2 | 7/2010 | Freeman et al. | |
| 7,782,479 B2 | 8/2010 | Handa et al. | |
| 7,805,340 B2 | 9/2010 | Blakeslee et al. | |
| 7,855,637 B2 | 12/2010 | Forster | |
| 7,858,888 B2 | 12/2010 | Lucas et al. | |
| 7,869,902 B2 | 1/2011 | Hunter et al. | |
| 7,899,713 B2 | 3/2011 | Rothschild | |
| 8,458,953 B2 | 6/2013 | Hunter et al. | |
| 8,504,211 B2 | 8/2013 | Applegate et al. | |
| 8,621,780 B2 | 1/2014 | Ochampaugh | |
| 9,861,026 B2 | 1/2018 | Mehrkens | |
| 9,861,027 B2 | 1/2018 | Reineccius et al. | |
| 9,861,028 B2 | 1/2018 | Reineccius et al. | |
| 9,877,424 B2 | 1/2018 | Reineccius et al. | |
| 2001/0007982 A1* | 7/2001 | Brown | G06Q 10/087 705/28 |
| 2003/0010791 A1 | 1/2003 | Gentiluomo et al. | |
| 2003/0214129 A1 | 11/2003 | Adler | |
| 2004/0041714 A1 | 3/2004 | Forster | |
| 2004/0045984 A1 | 3/2004 | Schuman et al. | |
| 2004/0065674 A1 | 4/2004 | Floyd | |
| 2004/0111335 A1 | 6/2004 | Black et al. | |
| 2004/0193454 A1 | 9/2004 | Foote et al. | |
| 2005/0000737 A1 | 1/2005 | Fox et al. | |
| 2005/0151456 A1 | 7/2005 | Yoon et al. | |
| 2005/0178144 A1 | 8/2005 | Crisp, III | |
| 2005/0232731 A1 | 10/2005 | Lund | |
| 2006/0038010 A1* | 2/2006 | Lucas | G06Q 10/087 235/385 |
| 2006/0173750 A1 | 8/2006 | Naley et al. | |
| 2006/0236925 A1 | 10/2006 | Lund | |
| 2006/0255060 A1* | 11/2006 | Miller | A01C 1/08 222/63 |
| 2007/0029788 A1 | 2/2007 | Adler | |
| 2007/0044820 A1 | 3/2007 | Chan et al. | |
| 2007/0062270 A1* | 3/2007 | Misra | G01G 17/04 73/149 |
| 2007/0214055 A1 | 9/2007 | Temko | |
| 2007/0225991 A1 | 9/2007 | Hollingsworth et al. | |
| 2008/0009962 A1 | 1/2008 | Hood et al. | |
| 2008/0033598 A1 | 2/2008 | Hollingsworth et al. | |
| 2008/0136131 A1 | 6/2008 | Sorg | |
| 2008/0215345 A1 | 9/2008 | Hollingsworth et al. | |
| 2008/0257975 A1 | 10/2008 | Matheis | |
| 2008/0271927 A1 | 11/2008 | Crain et al. | |
| 2009/0069930 A1 | 3/2009 | Peters et al. | |
| 2009/0071857 A1 | 3/2009 | Astwood et al. | |
| 2009/0087896 A1 | 4/2009 | Watson | |
| 2009/0125460 A1 | 5/2009 | Hewison et al. | |
| 2009/0125552 A1* | 5/2009 | Hunter | A01C 1/00 |
| 2009/0139907 A1 | 6/2009 | Hollingsworth et al. | |
| 2009/0180899 A1 | 7/2009 | Dietrich | |
| 2009/0324815 A1 | 12/2009 | Nielsen | |
| 2010/0023430 A1 | 1/2010 | Hunter et al. | |
| 2010/0032493 A1* | 2/2010 | Abts | A01G 25/092 239/11 |
| 2010/0089943 A1 | 4/2010 | Till | |
| 2011/0027479 A1 | 2/2011 | Reineccius et al. | |
| 2011/0093279 A1 | 4/2011 | Levine et al. | |
| 2012/0046785 A1 | 2/2012 | Deo | |
| 2014/0083358 A1 | 4/2014 | Reineccius et al. | |

FOREIGN PATENT DOCUMENTS

| | | |
|---|---|---|
| CL | 38645 | 3/1993 |
| CL | 38906 | 12/1994 |
| CL | 39638 | 8/1998 |
| CL | 1044-2001 | 5/2001 |
| CN | 2479482 Y | 2/2002 |
| CN | 201529516 U | 7/2010 |
| DE | 3415160 A1 | 10/1985 |
| DE | 4411058 A1 | 10/1995 |
| DE | 20113798 U1 | 12/2001 |
| GB | 2082540 A | 3/1982 |
| JP | 2001-503622 A | 3/2001 |
| JP | 2003-189715 A | 7/2003 |
| KR | 10-2004-0000854 A | 1/2004 |
| RU | 2270547 C1 | 2/2006 |
| RU | 2309568 C2 | 11/2007 |
| RU | 2317668 C1 | 2/2008 |
| WO | 9818311 | 5/1998 |
| WO | 0123820 A1 | 4/2001 |
| WO | 03034329 A1 | 4/2003 |
| WO | 03102845 A2 | 12/2003 |
| WO | 2005100166 A1 | 10/2005 |
| WO | 2006101394 A2 | 9/2006 |
| WO | 2008007349 A1 | 1/2008 |
| WO | 2008016368 A1 | 2/2008 |
| WO | 2011017252 A1 | 2/2011 |

OTHER PUBLICATIONS

KSi AutoBatch V2: Controller and Database Option; 1 page; Sep. 1, 2009.

LX2000 Seed Treater with PLC Controls: Operators Manual 2009 Model; 63 pages; 2009.

New Seed Wheel Adds Precision to USC LLC Seed Treaters; 2 pages; Jul. 17, 2006.

Seed Transfer System User's Manual: vol. 1, KSi Conveyors, Inc., KSi Automation; 41 pages; Apr. 15, 2008.

HC 2000 & 3000 ACCU-COAT®: High Capacity Seed Treater; Bayer CropScience; 2 pages; Jun. 8, 2009.

LP4000 Seed Treater, Rev. D; 2 pages; Mar. 1, 2008.

Automatic Weight Dispensing System, Recommended for Handsfree, Closed loop Slurry Mixing, Bayer CropScience LP, Gustafson; 2 pages; prior to 2009.

GLCPS Seed Treatment System, Recommended for Barley, Corn, Cotton, Soybeans & Wheat, Bayer CropScience, Gustafson; 2 pages; prior to 2009.

RMOM, Rotary Mist-O-Matic 501 & 1001, Installation and Operation Manual, Bayer CropScience, Gustafson; RMOM© 2006 Gustafson Equipment RF M/021006/RMOM/409KB; 15 pages; 2006.

BMC Lab Treating System, Recommended for Alfalfa, Canola, Corn, Soybean, Sugar Beet, Sunflower seeds, and Seed Percent Build-up; Bayer CropScience, Gustafson; 2 pages; prior to 2009.

"Expansion and Extension of the Green Technology Pilot Program," Federal Register, vol. 75, No. 217, Wednesday, Nov. 10, 2010, pp. 69049-69050.

(56) References Cited

OTHER PUBLICATIONS

"Elimination of Classification Requirement in the Green Technology Pilot Program," Federal Register, vol. 75, No. 98, Friday, May 21, 2016, pp. 28554-28555.
Seed Treatment Warning Label for AERIS Seed Applied Insectiside/ Hermatcide; BayerCropgcience; 2 pages; Sep. 2007.
Seed Treatment Warning Label for 42-S THIRAM Fungicide; Bayer CropScience LP; prior to Apr. 2012.
Installation Manual Commercial Series RH-800 & RH-2000; Gustafson-Bayer, 44 pages, rev. Nov. 9, 2009.
ACCU-TREAT® RH-800 & RH-2000, Rotary Seed Wheel Treater brochure, Gustafson, 1 page, rev. Jul. 1, 2009.
Crop Protection Bayer Systems for coverage you can count on, Gustafson Application Equipment and Accessories, Gustafson Equipment; Bayer CropScience; 15 pages; 2006.
Chemical Seed Treater Type CT 2-10 brochure, Petkus Technologie GmbH; 2 pages; Oct. 2007.
Chemical Seed Treater Type CT 1-10 brochure, Petkus Technologie GmbH; 2 pages; Oct. 2007.
Chemical Seed Treater Type CT 5-25 brochure, Petkus Technologie GmbH; 2 pages; Jun. 2008.
Mixing Chambers Blending and Film Coating; Bayer CropScience, Gustafson; 2 pages; Rev. Jun. 8, 2009.
Continuous Batch Treaters; Gustafson Equipment, Bayer CropScience; 4 pages; rev. Jul. 1, 2007.
Sayler, Tracy, "Dynasty Seed Treatment Adjusted," Sunflower Magazine, National Sunflower Association, 2 pages, Dec. 2006.
Yleef; Seed treatment costs 50 lb vs. 140000 units; Crop Talk; AgTalk; http://talkforums/thread-view.asp?tid=161818&mid=1161908; Posted Apr. 14, 2010 07:32; 2 pages.
A Combination Systemic and Contact Seed Protectant for Use on Lentils and Chickpeas. Crown® Provides Control of Seed-Borne Ascochyta (*Ascochyta rabiei*) on Chickpeas; Crown® Solution; Chemtur Canada Co./Cie; 5 pages; Jul. 14, 2010.
Stewart, Scott D. (editor); IPM Newsletter: Update for Field Crops and Their Pests; vol. 2; Agriculture Extension Service, The University of Tennessee, Jackson, TN; 4 pages; Apr. 25, 2003.

\* cited by examiner

Station 1 Details 3/23/2011 12:28:36 PM

| | |
|---|---|
| Chemical Name | Water |
| Keg BarCode Data | |
| Chemical Density | 8.34 Lbs/Gal |
| Est. Chemical Remaining | -0.0 Gal |
| Chemical Rate | 5.20 Oz/Min |
| # Seed Units Treatable | 0.0 |
| Total Chemical (Lifetime) | 18.6 Gal |
| Weight | 0.1 |

Manual Control: [Reverse] [Forward]

[Jog]

Pump Status: Stopped

Station Pump Speed: [▷] [▶▶] 1% [◀◀] [◁]

Last Scale Calibration
- Date
- Time

[Calibrate] [Flex Fill] [Exit]

Setup Screen

| Label | Value |
|---|---|
| Bayer Customer # | Test |
| Bayer Storage Location # | 0 |
| Cell Modem ESN | 00C1D000 |
| Cell Modem # | 9084007000 |
| Treater Model | RH2000 - 48" Diar ▽ |

Stations: 1, Water, Station 2, Station 3, Station 4, Station 5, Station 6, Station 7, Station 8, Station 12

Station 2

| Field | Value |
|---|---|
| Station Type | Keg ▽ |
| Chemical | None ▽ |
| Pump Model | None |
| | Gaucho 600 |
| | Allegiance310 |
| | Pro-ized Red Color |

[Cancel]

[Calibrate Scale] [Tune Drum] Tuning [Tune Seed Wheel] Tuning [Treater Setup] [Save/Exit]

[Cancel]

Fig. 10C

Flex Fill - Station 1

Step 1 Enter Density
Step 2 Fill the Flex Tank 8.340 Lbs/Gal
Flex Filled

Current Chemical | Water

Cancel

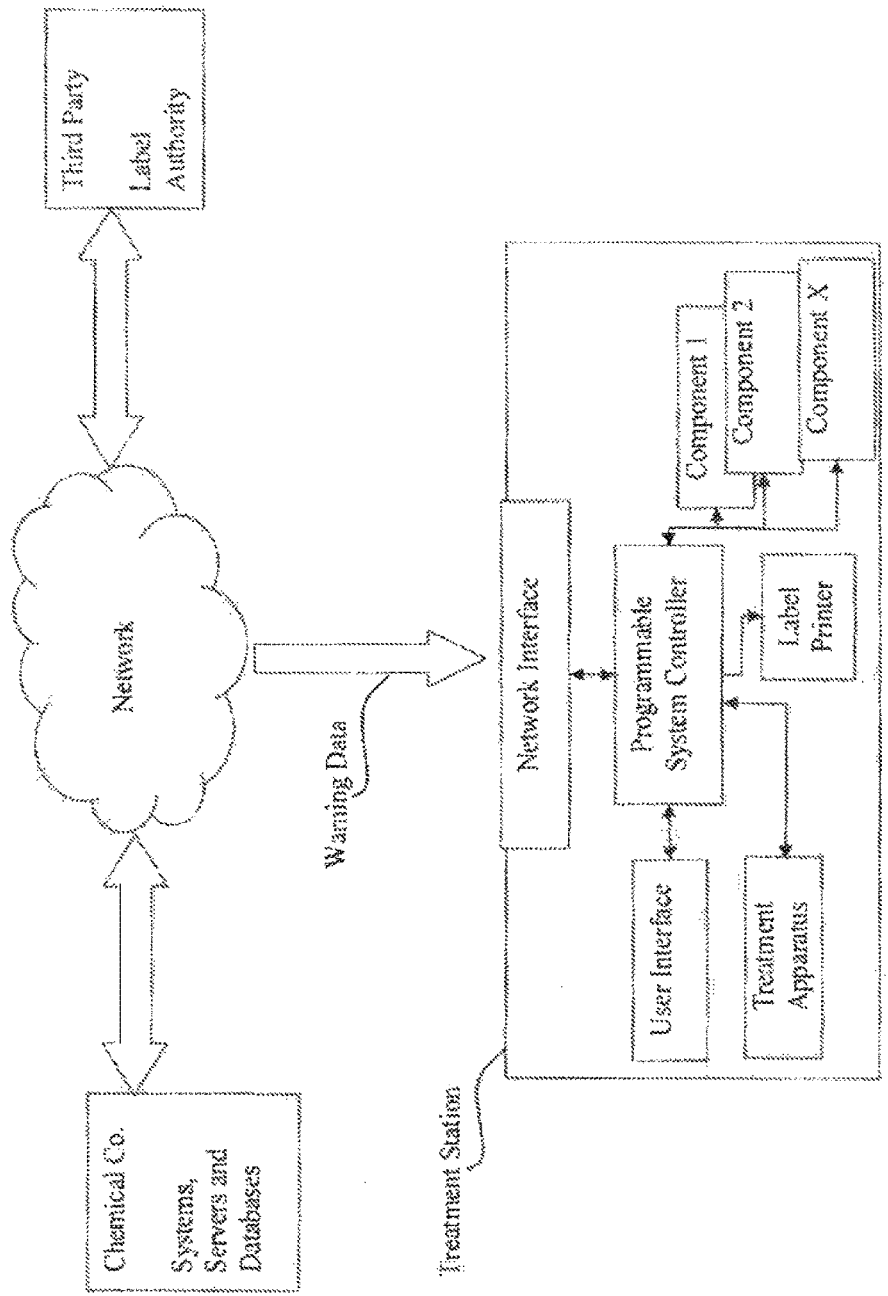

RETAIL POINT SEED TREATMENT SYSTEMS AND METHODS

RELATED APPLICATIONS

The present application is a continuation of U.S. patent application Ser. No. 13/993,041, filed Dec. 11, 2013, which is a National Phase entry of PCT Application No. PCT/US2011/064030, filed Dec. 8, 2011, which claims priority to U.S. Provisional Patent Application Nos. 61/421,030, filed Dec. 8, 2010, 61/469,432, filed Mar. 30, 2011, 61/469,370, filed Mar. 30, 2011, 61/553,711, filed Oct. 31, 2011, 61/553,692, filed Oct. 31, 2011, and U.S. utility patent application Ser. No. 13/314,148, filed Dec 7, 2011, each of which is incorporated by reference herein in its entirety.

FIELD OF THE INVENTION

Aspects of the invention relate to environmental stewardship and personnel protection in the seed treatment industry. More particularly, the present inventions generally relates to systems and methods of on-demand seed treatment, with remote monitoring and control functions, as well as the associated inventory control, supply chain and recycling systems.

BACKGROUND OF THE INVENTION

Seeds that are planted for agricultural and other purposes are often treated prior to planting. The treatments may accomplish various purposes including attacking target bacteria, molds and fungus that can contaminate seeds or that may be present in the soil. Also seed treatment can include insecticides, pesticides and provide deterrence or prevention of insect and other animal pests that would target seeds. Treatments can also provide fertilizer. Direct application of seed treatment allows for a reduction in the amount of treatment composition that would be required by application to soil after planting for many of the beneficial effects. Post-planting application may not penetrate the soil to a level or location where it would be effective, is weather dependent, and may not be as economical as direct seed application. Seed distribution is presently accomplished by delivering seeds to farmers that have been treated with a variety of chemical fertilizers, pesticides, or herbicides, in a central production facility.

The treatment of seeds before planting however involves the application of chemicals and other agents that are expensive and may even be toxic to the environment or workers. Various devices for treatment of seeds in batch or continuous treatment mode are known. U.S. Pat. No. 5,891,246 to Lund, the disclosure of which is hereby incorporated by reference, describes a seed coating apparatus for applying a coating fluid whereby seeds are dispersed with a seed dispersing member. U.S. Pat. No. 4,657,773 to Mueller, the disclosure of which is hereby incorporated by reference, describes a process and apparatus for dressing seed in which seed is guided over a dispensing cone through a jet of dressing and onto a rotary table. German patent No. DE 4411058 to Niklas, the disclosure of which is hereby incorporated by reference, describes a device with a mixing bowl connected to a high speed, multi-turn actuator and a mechanism to feed seed into the mixing bowl. U.S. Patent Publication Nos. 2011/0027479 and 2006/0236925, the disclosure of which is hereby incorporated by reference, discloses various seed treatment apparatus that can be utilized to apply a treatment product or composition to a volume of seeds.

The treatment of seeds with fluid chemical components, often combined in a water based solution, can be affected by various environmental conditions such as ambient temperature, atmospheric humidity, or the moisture content of the seeds that are to be treated. Accordingly, there is a need for an improved way to contain, control and automate the amount of treatment products applied to the seeds to minimize waste, ensure treatment uniformity, minimize cost and control the moisture level in the treated seeds to prevent damp or "tacky" seeds that may clump together, particularly at the retail level where seed is treated and sold to individual farmer customers.

Certain computerized large-scale seed treaters can treat large batches of seeds in centralized distribution centers. However such equipment is expensive and not generally suitable for use at the retail level. Moreover, the delay caused by shipping treated seed between a central facility and the ultimate planting of that seed can reduce the optimal effects of a treatment applied to the seed. For certain treatments, including formulations having several treatments applied simultaneously to the seeds, the seeds need to be planted very soon, within hours after application, for optimal effectiveness. This is problematic with existing seed treaters and treating controls as such are expensive and typically are not easily used for repeated and rapid processing seed batches for multiple individual users at retail locations.

At such retail locations, if they do have seed treating capabilities, the chemical slurries to coat the seeds are mixed in open mixing bowls or vats, often having personnel actually measure particular liquid ingredients to be added to an open mixing bowl. Such liquid chemicals/formulations may be manually handled and manually poured into the vats. Then the liquid in the vat is ideally agitated and then pumped into seed treatment equipment. Such personnel are not necessarily well trained and the risk of personnel exposure to the chemicals as well as the risk spillages and improper disposal of the treatment chemicals is high. Precisely controlling quantities and application levels and even applying correct formulations is problematic. Moreover, there is simply no means for recording and verifying precisely what and how much has been applied to the seed. There is generally no automatic moisture control and dynamic rate application system available to seed treaters, resulting in possible inconsistent treatment of certain chemicals and less than ideal moisture content of treated seeds. A need exists to provide application controls, personnel protection, and environmental protections, and accurate dynamic treatment systems that are particularly suitable for the retail seed locations.

SUMMARY OF THE INVENTION

Aspects of the present invention are directed to on-demand seed treatment systems and methods that provide dynamic application rates of treatment components, efficiently providing safety and operational advantages to all parties involved, as well as to support systems for facilitating the exchange of information between the parties and, in some cases, decision-making ability for ensuring proper operation of the treatment systems. The systems can be used for any size application, but are particularly useful for small-to-medium level treatment entities such as retailers that sell and distribute seeds locally to farmers, who are the end-customers of treated seed. Embodiments of the invention can locally and remotely provide control of and monitoring of the treatment of seeds, including proper equipment functioning, inventory use, as well as providing detailed data collection, reporting and accounting as desired, as well as adapt to changes in environmental conditions that can impact the seed treatment process.

In one aspect of the invention, a process for automatically (i.e., carried out by a machine running under program control) treating seed at a retail seed distribution center includes automatically applying, via a sealed seed treatment system, a plurality of chemical treatments to a batch of seed based on a seed treatment recipe. Operational data representing at least consumption of individually-maintained chemicals is automatically collected and provided to a remotely-hosted information system located remotely from the retail seed distribution center. A re-supply of chemicals is received from a third party that is distinct from the retail seed distribution center in response to the providing of the operational data to the remotely-hosted information system.

According to another aspect of the invention, a system for automatically treating seed at a first retail seed distribution center includes a seed treatment vessel configured to apply a one or more chemical treatments controllably delivered from individually-maintained chemical storage containers to a batch of seed based on a seed treatment recipe, and a system controller. The system controller configured to control the delivery of the one or more chemical treatments to the seed treatment vessel; collect operational data representing at least consumption of chemicals maintained in the chemical storage containers; and provide the operational data to a remotely hosted information system located remotely from the retail seed distribution center and communicatively coupled to the first retail seed distribution center and to a plurality of other retail seed distribution centers geographically distinct from the first retail seed distribution center. The first retail seed distribution center receives a re-supply of chemicals from a third party chemical supplier that is distinct from the first retail seed distribution center, which sends the re-supply in response to provision of the operational data to the remotely-hosted information system.

In another aspect, a process for automatically treating seed at a retail seed distribution center includes automatically applying, via a sealed seed treatment system, a plurality of chemical treatments to a batch of seed based on a seed treatment recipe. Operational data representing at least consumption of individually-maintained chemicals is automatically collected and provided to a remotely-hosted information system located remotely from the retail seed distribution center. A re-supply of chemicals is received from a third party that is distinct from the retail seed distribution center in response to the providing of the operational data to the remotely-hosted information system.

In another aspect of the invention, an information system for supporting operations of a plurality of geographically distributed retail seed treatment centers is provided. The system includes a network interface module adapted to be communicatively coupled to a plurality of retail seed treatment systems that are located at the plurality of retail seed treatment centers. An account service logic module is adapted to communicatively interface, via the network interface module, with a plurality of distinct parties including a seed retailer party corresponding to each of the retail seed treatment centers, and at least one supplier party. The account service logic module is adapted to provide information exchange functionality between each seed retailer party and the at least one supplier party, where operational data that is automatically generated by the seed treatment system of each seed retailer party is received by the account service logic module and provided to the at least one supplier party, and where material handling data that is generated by the at least one supplier party is received by the account service logic module and provided to each seed retailer party.

In a further aspect of the invention, a method for supporting operations of a plurality of geographically distributed retail seed treatment centers by an automated information system includes: communicating, via a network interface module, with a plurality of retail seed treatment systems that are located at the plurality of retail seed treatment centers; communicating, via the network interface module, with a plurality of distinct parties including a seed retailer party corresponding to each of the retail seed treatment centers, and at least one supplier party; and facilitating information exchange between each seed retailer party and the at least one supplier party, such that operational data that is automatically generated by the seed treatment system of each seed retailer party is received via the network interface module and provided via the network interface module to the at least one supplier party, and wherein material handling data that is generated by the at least one supplier party is received via the network interface module and provided via the network interface module to each seed retailer party.

According to another aspect of the invention, an automated seed treatment system is adapted for on-site operation at a retail seed distributor. In the system, a sealed seed-treater vessel is configured to apply a plurality of chemical treatments to a batch of seed based on a seed treatment recipe. A plurality of pump-stations are sized to receive a sealed transportable chemical container, each pump-station includes a pump and a pump controller configured to operate the pump, and a flow channel fluidly coupled to the seed-treater vessel. A programmable system controller is electrically coupled to the pump controller of each of the plurality of pump-stations. The controller is configured to receive a material transfer indication from each of the plurality of pump-stations and issue commands to the pump controller of each pump-station in response to the seed treatment recipe. The programmable system controller is further configured to collect operational data representing at least consumption of chemical from the chemical container at each of the pump-stations based on the corresponding material transfer indication during seed treatment and to provide the operational data to a remotely hosted information system, which is located remotely from the site of the retail seed distributor and accessible to at least one third party that is distinct from the retail seed distributor.

In yet another aspect of the invention, an automated seed treatment system adapted for on-site operation at a retail seed distributor includes a sealed seed-treater vessel configured to apply a plurality of chemical treatments to a batch of seed based on a seed treatment recipe. A plurality of pump-stations are sized to receive a sealed transportable chemical container, each pump-station including a pump and a pump controller configured to operate the pump, and a flow channel fluidly coupled to the seed-treater vessel. A programmable system controller is electrically coupled to the pump controller of each of the plurality of pump-stations and configured to receive a material transfer indication from each of the plurality of pump-stations and issue commands to the pump controller of each pump-station in response to the seed treatment recipe. The programmable system controller is configured to transmit the seed treatment recipe to a remotely-hosted database and, in response thereto, to receive from the remotely-hosted database handling and warning label information corresponding to the seed treatment recipe.

BRIEF DESCRIPTION OF THE DRAWINGS

The embodiments of the present invention may be more completely understood in consideration of the following detailed description of various embodiments of the invention in connection with the accompanying drawings, in which:

FIGS. 10A-10C depict exemplary seed treatment system pump station detail screens according to one type of embodiment.

FIG. 10D depicts an exemplary flex fill instruction screen according to one embodiment.

FIG. 20 depicts a high-level block diagram of an exemplary embodiment of a seed treatment station coupled through a network to a chemical company server system and a third-party warning label regulatory authority.

Figure 1:
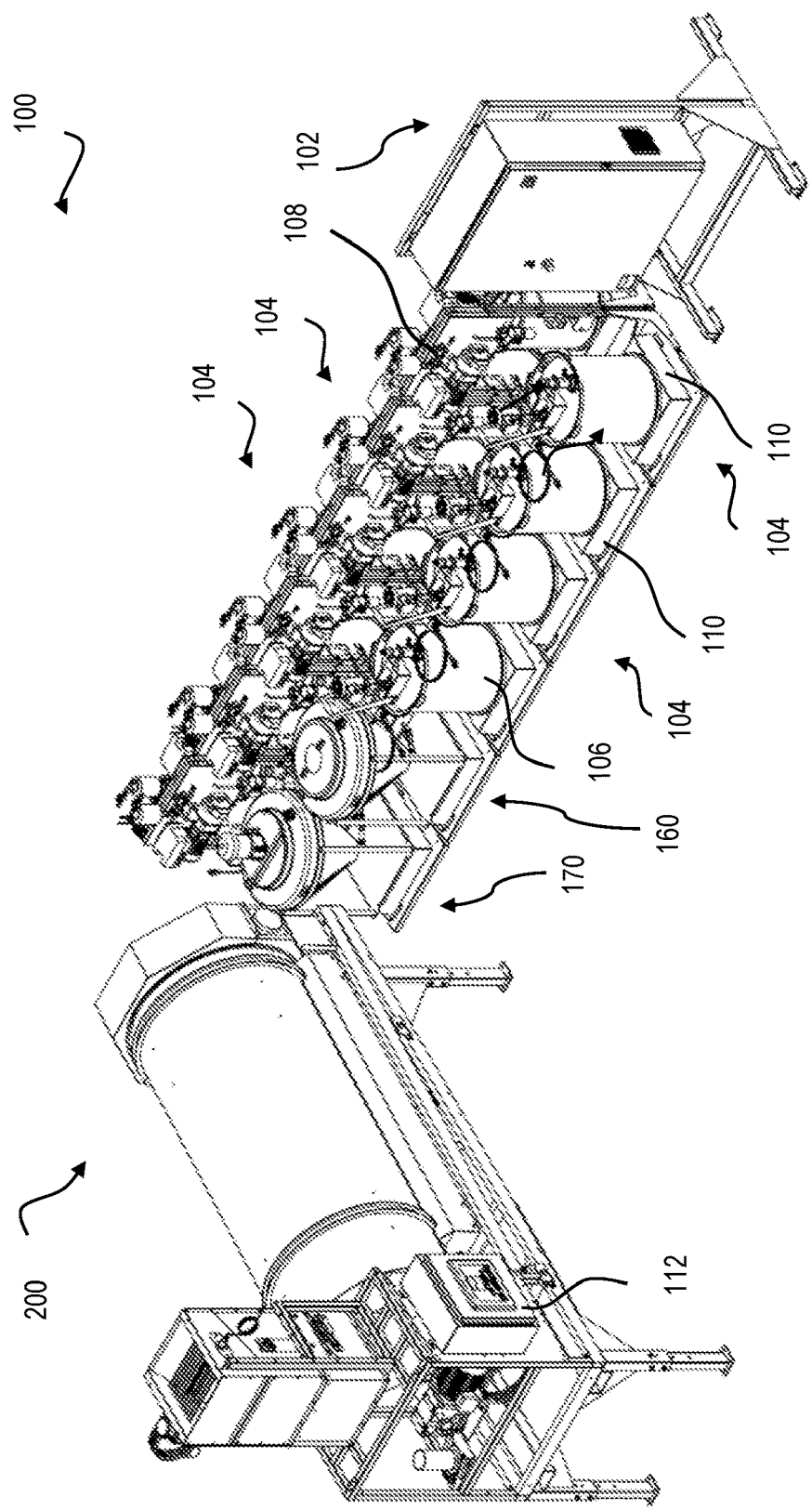
FIG. 1 depicts an exemplary embodiment of a seed treatment system with ten keg stations, a flex-tank station, and an agitator station.

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Crop seeds can be treated with a variety of components or formulations such as fertilizer, herbicide, fungicide, insecticide, or any of a variety of combinations of these chemicals, typically along with a colored dye or other indicator that the seed is treated. A seed treatment recipe or combination of formulations can vary due to the needs of a farmer who will plant the seed, the type of seed, and the seed-growing environment. The term formulation as used herein denotes combinations of chemicals for use in seed treatment. The term recipe as used herein is meant to encompass formulations as well as process steps for treating seed. Environmental factors can include, the geographic planting region, soil types, the potential presence of specific plant diseases or pests, climate, growing season, etc. A farmer may need to account for some or all of these variables when selecting seeds and requesting seed treatments prior to planting.

Due to the variety of seed types and chemical treatment formulations that are available it is not efficient or necessarily practical to produce or maintain an inventory of treated seeds with all possible combinations of seed and seed-treatments that are be desired to accommodate the widest possible variety of seed-treatment requests. Given the potentially hazardous nature of some chemicals it is important that only an appropriate amount of chemical treatment be applied to a batch of seeds, that all appropriate regulations be followed in the handling and application of chemical formulations, and that exposure of the chemicals to humans or the external environment is limited to the extent feasible. Therefore, one aspect of the present invention is directed to enabling a seed retailer to accurately and dynamically treat a wide variety of seeds with any of a number of chemical treatment formulations at the retailer's point of sale, in an on-demand fashion, with a safe and contained automated treatment system.

In an embodiment of the present invention, application of one or more seed treatment formulations, either alone or in a mixture with each other, as defined by a treatment recipe, are metered by pumps that are controlled electronically via a programmable electronic control panel. The electronic control panel can include a unique and custom-programmed controller or computer that "drives" or operates a treatment system based on one of a variety of entered chemical treatment recipes. The controller is configured with software to also oversee or monitor all processes during treatment, including the rate and quantity of each chemical treatment formulation that is applied to the seed as well as the rate the seed flows through the treatment apparatus. During the seed treatment process the controller software can be configured to monitor environmental conditions such as ambient temperature, relative humidity, and the moisture content of seed entering and exiting a seed treatment apparatus, and adjust the treatment rate in response to one or more of these conditions.

The operator of an embodiment of a seed treatment device of the present invention can select a recipe, and instruct a system controller to in turn operate one or more pumps, attached to various drums or kegs containing components of the recipe, to deliver the component(s) from the keg to a manifold system or other apparatus that applies the components to a batch of seed. In this manner, the various components of the recipe are transferred from the kegs to the application area of the seed treatment device and are applied in the proper amounts to coat a quantity of seed in the seed treatment device. The need to pre-mix or hand-mix various recipe components and chemical formulations can be reduced or entirely eliminated. Alternatively, pre-mixed chemical formulations can also be provided to the system from an intermediate mixing or slurry tank and any associated pumps, hoses, or other plumbing to accommodate an already installed seed treatment system or chemical treatment components that are not available in keg-style containers.

In an embodiment of the present invention, the system can maximize the utilization of purchased treatment components by withdrawing substantially all of the component from each keg, thereby minimizing the amount of unutilized contents in the keg. For example, as the contents of a keg are depleted, or nearly depleted, sensors associated with the kegs can provide a signal through an interface to the system controller that can then issue an alert the custom seed-treater's operator indicating an instruction to prepare to replace the keg in a timely fashion. The sensors can monitor each unique keg to continuously calculate the amount of chemical composition remaining in each keg as its contents are applied during the treatment process based on the changing weight of the keg as provided to the system by the scale or load cell positioned under each keg at each keg station. When the weight of the keg stops changing during the application of the chemical treatment component the system can determine that the keg is effectively empty and that further pumping action could introduce air into the treatment lines. This allows the system to withdraw the entire treatment component in the keg that can be physically extracted with the dispensing hardware, while still preventing the system from under treating a batch of seed due to an empty keg. When the system has determined that no more fluid can be withdrawn from the keg the system can pause the treatment process until the keg is replaced, or begin withdrawing, or increase the pumping rate, of the same treatment component fluid from a different keg station that is equipped with an equivalent treatment component.

An embodiment of the present invention utilizes bar codes or RFID tags to uniquely identify each individual keg, drum, or other chemical container. The identification information encoded on each keg by a bar code label or RFID tag can include information such as the manufacturer of the contents of the keg, the batch or lot number associated with the contents of the keg, the size or capacity of the keg, the actual weight of the keg when empty, the actual amount of chemical product contained within the keg as provided by the manufacturer or chemical supply company, the density of the chemical product contained within the keg, a check digit to authenticate or error check the identifying data, a unique keg serial number, or other useful identifying information. In one embodiment a RFID chip can be embedded in a bar code label to provide additional or redundant keg information to the system.

An embodiment of the present invention includes modular keg stations that connect individual kegs of chemical formulations to a seed treatment apparatus. A plurality of keg stations are coupled to a manifold that can combine the formulations from a plurality of kegs into a mixture as directed by a recipe that is programmed into a system controller. The resulting fluid mixture can be further mixed by directing the fluid through an oscillatory baffled reactor, a slurry tank, or other fluid mixing apparatus prior to application of the chemical to the seeds by the seed treatment apparatus. Water from an external source can be injected into the fluid mixture to control the concentration or moisture content of the formulation. The system or an operator can adjust the concentration of the formulation to accommodate the application speed of the seed treatment apparatus. The amount of time a quantity of seed must remain in the treatment apparatus to be properly coated with the formulation can be dependent on the concentration of the formulation, the moisture content of the seeds being treated, and ambient conditions such as temperature, relative humidity and atmospheric pressure. Ambient conditions can be monitored by a weather station apparatus coupled to the system.

An embodiment of the present invention includes a Graphical User Interface (GUI) that can provide real-time seed treatment reporting, inventory status and information, keg status reporting, weather conditions, and alert notifications, along with an interface to configure recipes and batches for seed treatment. The GUI provides a local operator with the capability to configure the system for operation and to monitor the chemical treatment process. The GUI can also provide an interface to initiate or review updates to recipes that are downloaded from a remote location via the system's network connection. The GUI can also provide an interface to enter or configure a customized recipe or the rate of treatment application at the local installation of the system.

Turning now to the figures, an exemplary on-demand seed treatment system is depicted in FIG. 1. The seed treatment system 100 can include a system controller 102, a plurality of keg stations 104 each typically including a replaceable keg 106 containing a chemical treatment, a pump 108 and scale 110. A keg 106 (also referred to as a drum or container) can be in a range of sizes, for example in an embodiment the keg 106 can have a capacity of approximately fifteen gallons. Alternative kegs can range in size from five to twenty-five gallons. In yet another related embodiment, kegs can range in size from seven to fifty-five gallons. In an embodiment the keg 106 can have a capacity of approximately thirty gallons.

FIG. 1 depicts an exemplary embodiment of a seed treatment system with ten keg stations 104, a flex-tank station 160, and an agitator station 170. The agitator station 170 can include a stirrer mechanism 142 actuated by a stirrer-motor 138, as depicted in the example keg station in FIG. 3.

The pump 108 for each of the plurality of keg stations 104 can provide chemical treatment from each keg 106 to a seed treatment application apparatus 200. In an embodiment pump 108 can be a peristaltic pump, or roller pump, a high-volume fluid pump, or another appropriate type of positive displacement pump. The system controller 102 can be coupled to a user-interface 112 such as a graphical touch-screen that can provided a user or operator of the seed treatment system 100 with a variety of menus, alerts, alarms, data-entry fields, and other options to configure or operate the system 100. The system controller can also be coupled to a local weather monitoring station that can provide the system with the ambient temperature, relative humidity, and atmospheric pressure. An emergency stop button or switch can be coupled to the system controller 104 to allow an operator to immediately halt the treatment process in case of an emergency or other system failure.

Figure 2A:
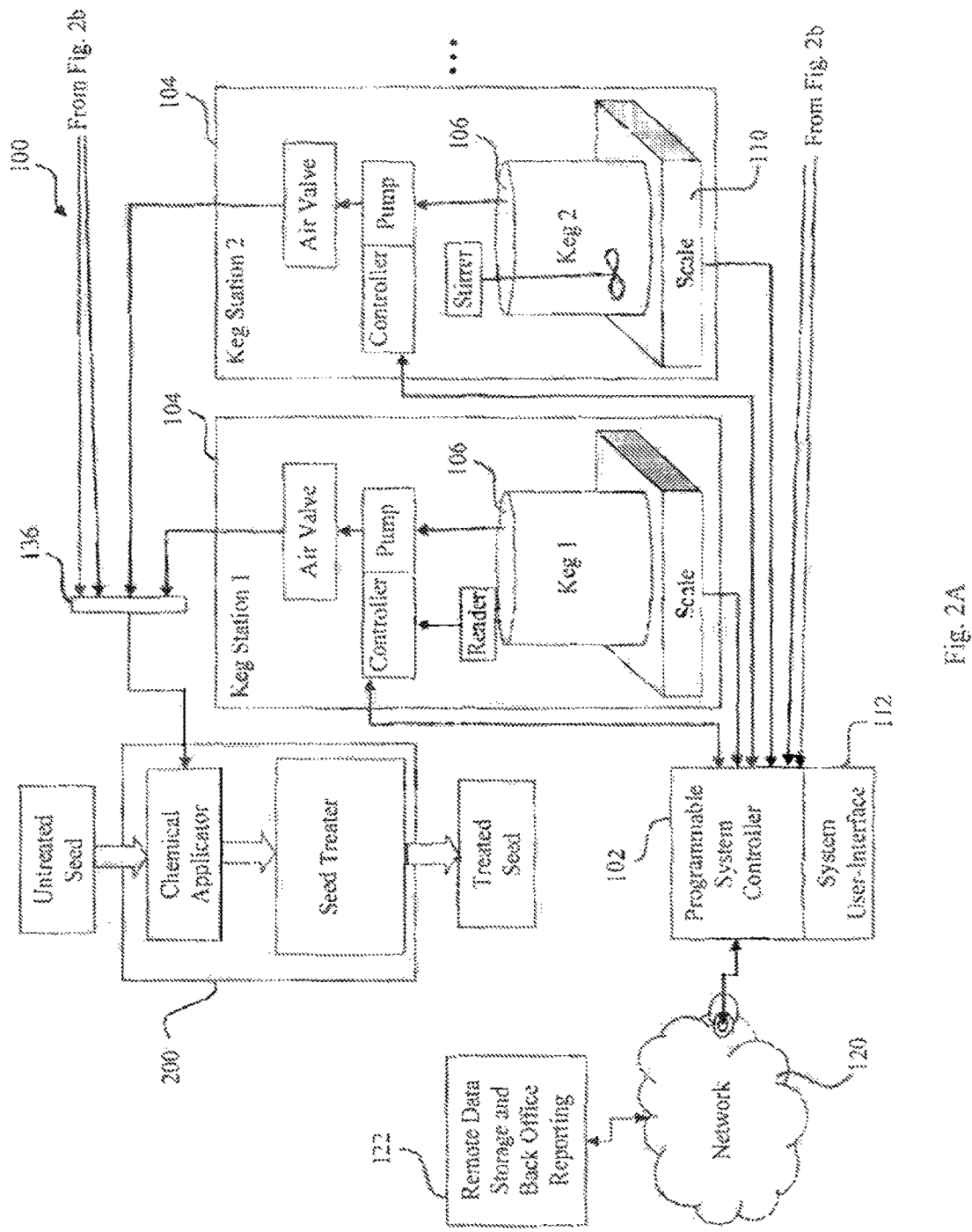
FIG. 2A-2B is a block diagram of an exemplary embodiment of a seed treatment system.
Figure 2B:
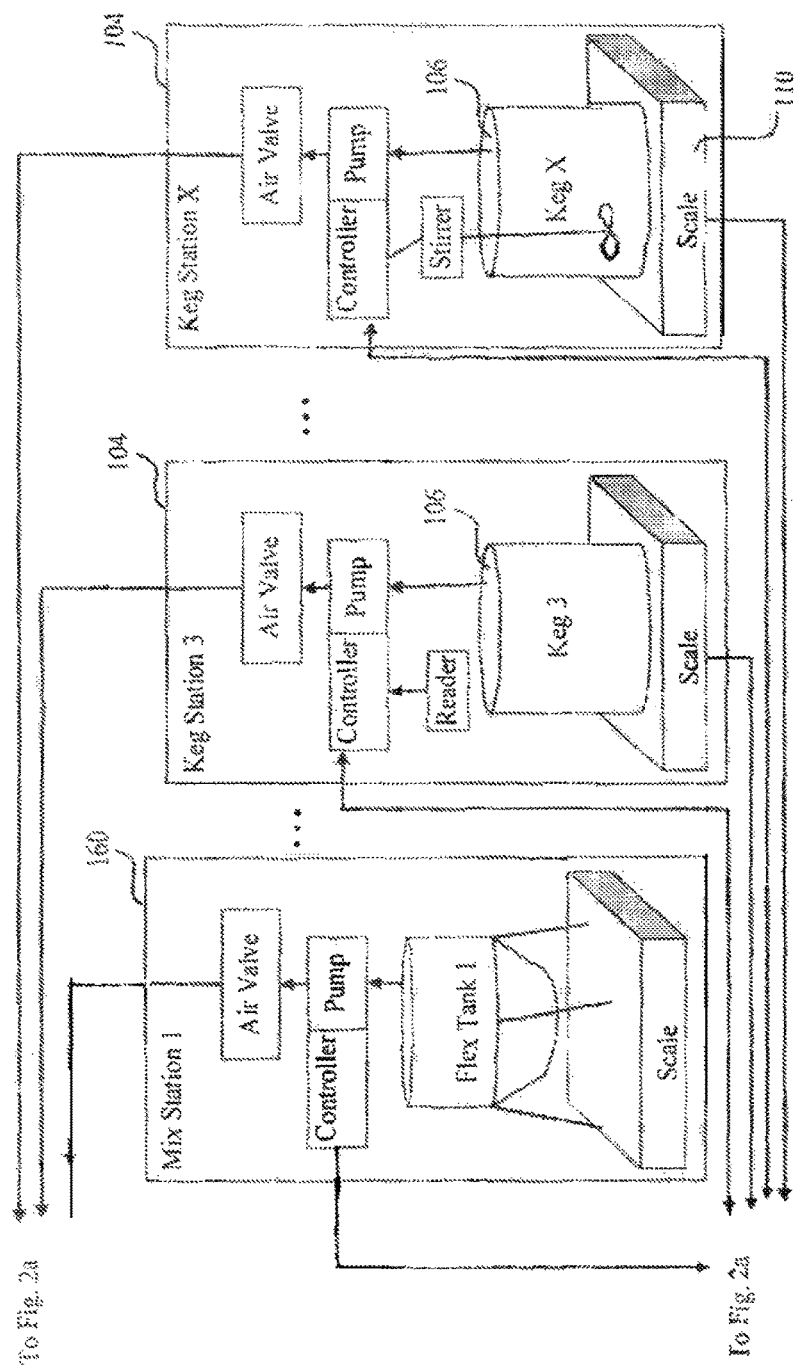

Referring to FIG. 2A, in the example embodiment shown the system controller 104 is connected to a network 120, such as the Internet, a private corporate intranet, a cloud-based computer network, a cellular telephone network, or suitable one or more communication networks. Network connectivity to the system controller 102 can be bi-directional. The system 100 can be connected through network 120 to a remote data storage and reporting facility 122. The facility 122, or back office, can include one or more databases, or an inventory management system such as an enterprise resource planning (ERP) product available from SAP AG or other software provider, and an electronic computer readable storage medium configured to gather, process, and store any data received from one or more individual treatment systems 100.

In a related embodiment, the reporting facility 122 can also store and distribute through network 120 treatment recipes and formulation information for the various chemical treatment formulations. Formulation information can include label data, manufacturer information, lot or batch identification and properties, formulation properties such as density or stirring requirements, and any other relevant data that may be useful for the application of the chemical formulation to treat seeds.

In one embodiment the reporting facility 122 can manage and track the location, use, and contents of each individual keg 106 that has been registered with the facility 122. Each keg 106 includes a bar code or RFID tag to uniquely identify each individual keg, drum, or other chemical container. An RFID tag can be embedded in a barcode label affixed to each keg 106 to provide redundant or additional information. The identification information encoded on each keg 106 by a bar code label or RFID tag can include information such as the manufacturer of the contents of the keg, the batch or lot number associated with the contents of the keg, the size or capacity of the keg, the weight of the keg when empty, the weight of the keg when assembled with a pre-installed stirring apparatus, the actual amount of chemical product contained within the keg as provided by the manufacturer or chemical supply company, the density of the contents of the keg, a check digit to authenticate or error-check the identifying data, a unique keg serial number, or other useful identifying information or data.

For example, a seed company can utilize real-time access to the seed treatment system 100 to modify, replace, or update seed treatment recipes or formulations. Treatment information for every batch of seeds can be transmitted to the treatment controller 102 from a data storage point at an individual seed company, from a cloud-based data store, or reporting facility 122, through a network 120.

In an embodiment system 100 can be configured to only produce batches of treated seed in accordance with pre-programmed recipes, or recipes that are purchased or downloaded from the remote data storage and reporting facility 122. In another embodiment system 100 can be configured to allow customized or unique recipes to be programmed directly into the system 100 through the user-interface 112 or by coupling the system controller 102 to a personal computer, a tablet computer, a removable non-volatile media storage device or other computer readable medium, from which the customized recipes can be received. The capability of the system 100 to lock out unauthorized recipes and otherwise control the administration of the system can be accomplished with a security log-in mechanism or other access control that can prevent unauthorized access or modification to the system 100 and its configuration while still providing access to individual users or operators that can initiate, monitor, and complete the batch treatment process. Users or operators can optionally be allowed to adjust the overall treatment rate in order to accommodate seed handling needs or variances in the performance of specific seed treatment apparatus or components. The system controller 102 can also be configured to record a user-id associated with an individual user that is operating the system 100 such that a database record for each batch of treated seed can include the user-id of the individual associated with that batch.

The tracking and management of each keg 106 can also provide for first-in first-out (FIFO) management of individual chemical formulations. For example, if a retail location receives separate deliveries of identical chemical formulations at different times the system 100 can require that the older chemical formulation to be placed on a keg station 104 before the newer, second-to-arrive, keg. In this manner the efficacy of the chemicals is managed and monitored. In a related approach, if an individual keg is stored in an inventory for a period of time longer than desired to ensure the efficacy of the chemical formulation, the system 100 can prevent the use of that keg if an operator attempts to use the chemical formulation after it has expired. In one embodiment the system 100 can instruct the operator to return the keg to an appropriate chemical recycler or the original chemical supplier. In one embodiment the system can notify the chemical supplier, through a network connection 120 to a central data store, of the location of each keg that contains an expired product.

Figure 3:
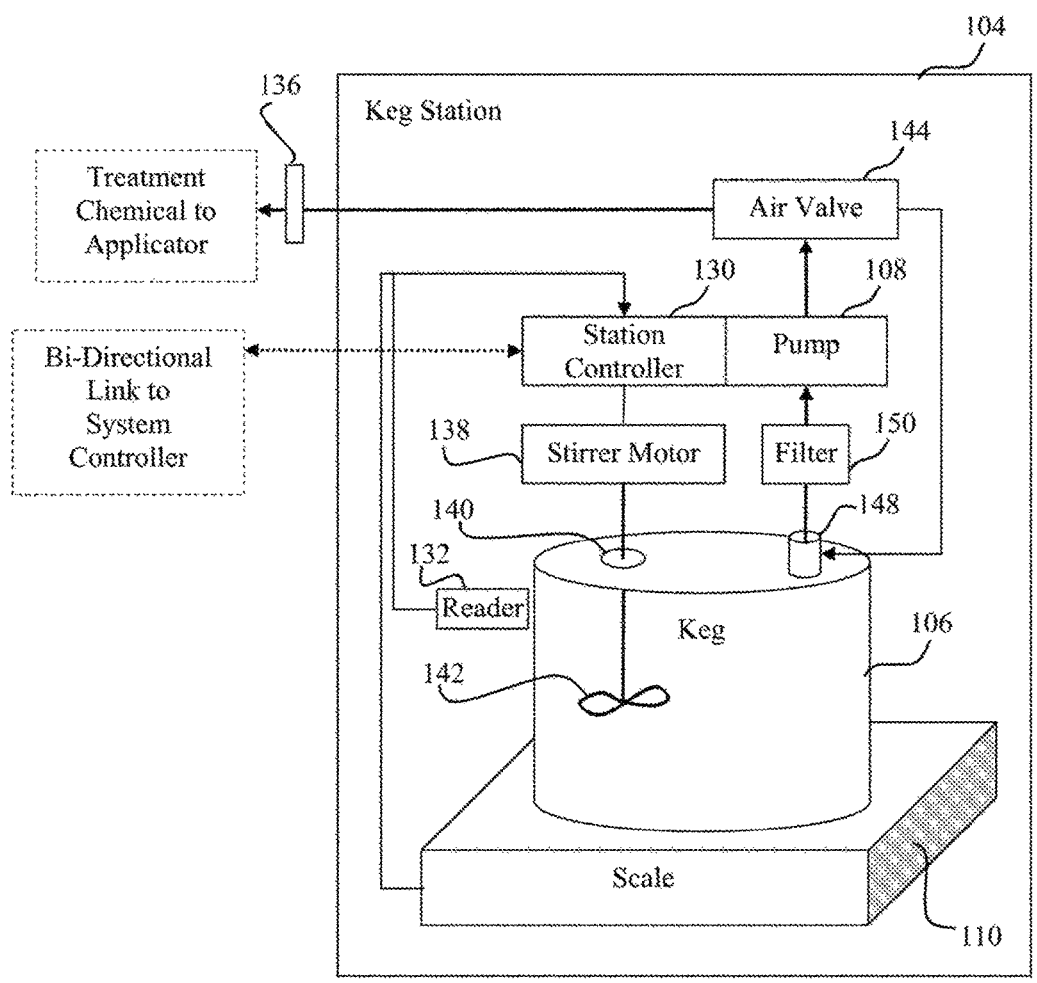
FIG. 3 is a block diagram of an exemplary embodiment of a keg station.
Figure 4:
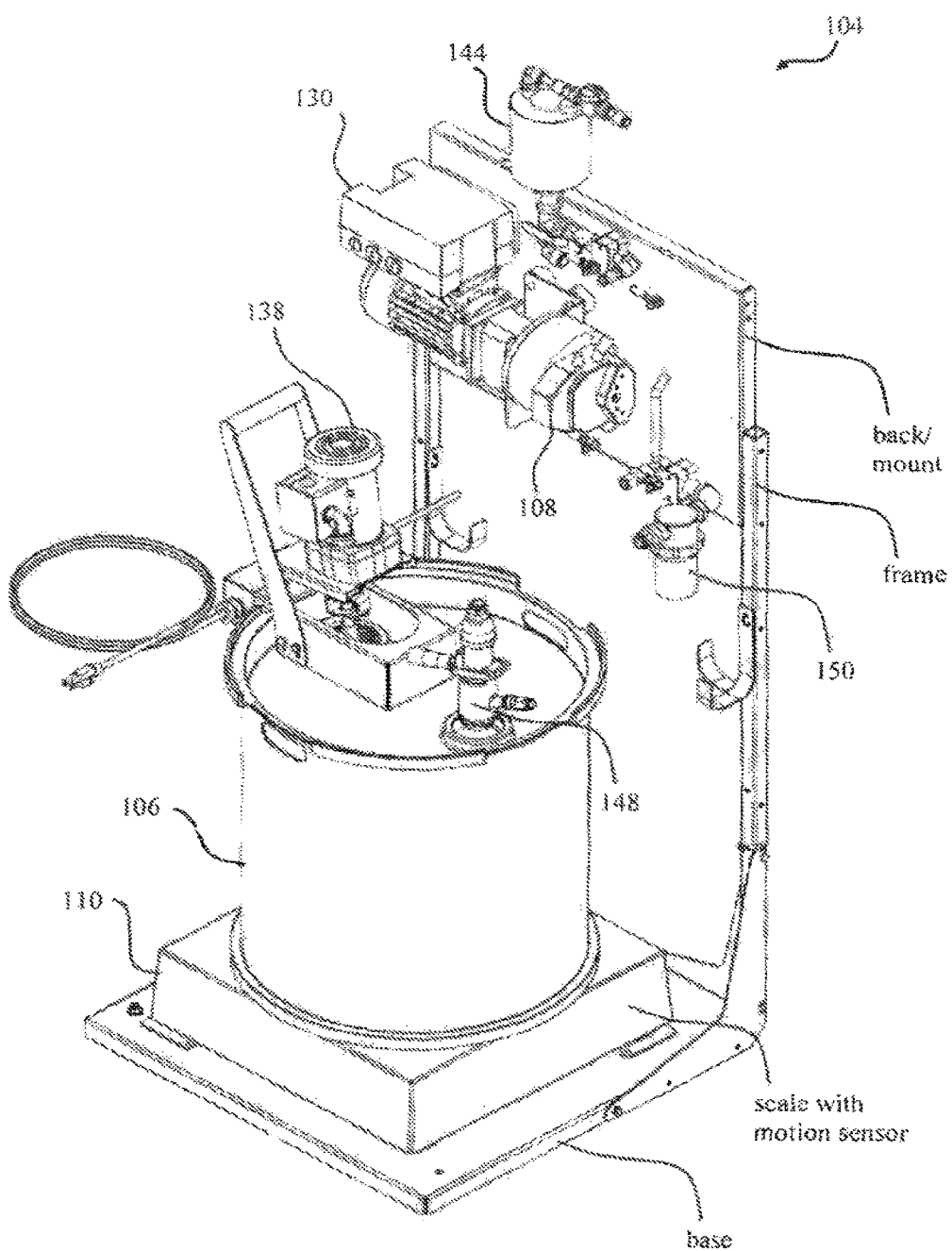
FIG. 4 depicts an exemplary embodiment of a keg station.

FIGS. 2A, 2B, and 3-4 depict exemplary embodiments of keg station 104. A keg station 104 can include a scale 110 mounted on a base platform, the scale being sized to receive a single keg 106. The scale 110 can provide continuous or periodic measurements of the weight of the keg 106, and any changes in the weight of the keg 106 that would indicate a change in the volume of chemical stored in the keg 106. The scale 130 of the keg station 104 can be electrically coupled to the system controller 102 and provide weight measurements to the system controller, as depicted in FIG. 2A. In a related approach, as shown in FIG. 3, the scale 110 can be electrically coupled to a station controller 130. When the density of a chemical formulation is known, typically retrieved from information encoded in an RFID tag or manually provided to the system controller 102, an accurate measurement of the weight of a keg 106 and the change in weight of the keg over time can be used to calculate the volume and rate of chemical being delivered to the seed treatment applicator 200. The calculated volume and rate of delivery can be utilized by the station controller 130 to automatically adjust or fine tune the delivery rate of each chemical component to match the desired application rate as provided in a treatment recipe.

The monitoring of the changes in the weight of the keg 106 via scale 130 during the application process can provide the system controller 102 with accurate data indicating the amount of chemical that is actually being applied to a quantity of seed being directed into the seed treatment applicator 200. Accurate weight measurements of the keg 106 and its contents can be obtained through the use of a motion sensor coupled to the scale 110 and in communication with the controller 130 such that the station controller 130 is notified of movement that could cause the scale 110 to provide an inaccurate reading. Oscillations due to the placement of a new keg on a scale, floor vibrations, or accidental contact with a keg 106 by an operator or other external source can cause inaccuracies that should be minimized or avoided by only weighing the keg when the scale is providing a stable reading and no motion is detected.

Generally, a keg station 104 can include a modular platform or station that includes a scale 110 or load-cell to continuously or periodically measure the weight of a keg 106 and its contents, an accurate variable-flow pump 108 configured transfer specific amounts of fluid from a keg 106 to an applicator manifold 136, a stirrer assembly 138 that includes a motor and stirrer-coupler 140 coupled to a stirring apparatus 142, an air removal valve 144 that can prevent gas build-up in the fluid lines to manifold 136 and remove any air introduced into the line, a keg coupler 148 and associated piping or tubing to deliver the contents of an individual keg 106 to the seed treatment apparatus 200. Coupler 148 can be a quick connect coupling device that is self-sealing, for example, a commercially available RSV (Reusable Stainless Valve) closed chemical system coupler as produced by Micro Matic USA, Inc. of Sparks, Nev. Coupler 148 can include a return port that allows any over flow from air removal valve 144 to be returned into keg 106.

Keg station 104 can also include a station controller 130 coupled to a pump 108 that can operate to remove the chemical contents from the keg 106 through coupler 148. The station controller 130 can be electrically coupled to the system controller 102. The system controller can provide the station controller 130 with commands directing the operation of pump 108. Commands can include pump speed, pumping duration, and pump direction. The station controller 130 can transmit pump or station data to the system controller 102. Station data can include weight measurements supplied by the scale 110 to the station controller 130. Additional details regarding keg stations can be found in U.S. Provisional Application No. 61/469,370, which is incorporated by reference herein.

Seed treatment chemicals can be distributed in drums or kegs 106 with a capacity of approximately fifteen gallons, although other sized kegs of approximately five to sixty gallons can also be accommodated by various embodiments. Kegs or drums with a capacity of greater than approximately fifty-five gallons may call for larger or additional load cells in scale 110. Kegs 106 are generally configured to reduce the potential for spillage or contamination and provide a safe and convenient mechanism for transport. Each keg 106 can be labeled or coded with a bar-code, quick response (QR) code, a Radio Frequency Identification (RFID) tag, another unique identifier, or a combination of identifiers, that can include or reference information such as the chemical contents, weight, formulation, batch number, lot number, manufacturer, capacity, owner, or status of the keg and its contents.

Each keg can include a separate stirrer coupler 140, a coupler 148 that can be in fluid communication with a dip tube in the keg 106, and a fill port 151. The stirrer 142 and stirrer-coupler 140, along with the coupler 148 can be installed prior to filling the keg. Once filled with a chemical treatment component the fill port 151 can be sealed such that fluid can only be withdrawn from the keg 106 through the coupler 148. In this manner the keg can remain sealed during transit and use, preventing or minimizing any risk of spillage or contamination of the contents of the keg 106.

Keg station 104 can include a reader that is electronically coupled to the station controller 130 or the system controller 102. In various embodiments of the invention the reader can comprise a bar code scanner, a RFID tag reader, a QR code reader, or any other appropriate inventory identification or monitoring equipment. In the example of an RFID tag reader, the reader 132 can be coupled to the keg station 104 such that only a single keg 106 can be positioned such that an RFID tag disposed on the keg 106 can be read by the reader 132. The reader can provide the RFID tag data from keg 106 to the station controller 130 or the system controller 102. The link between the reader 132 and the station controller 130 or the system controller 102 can be wired or wireless.

In a related embodiment the reader 132 can comprise a wireless bar code scanner that is in electronic communication with the system controller 102. The system controller 102 can be configured to require that the reader 132 identify a keg 106 when it is placed on the scale 110 prior to the activation of pump 108. In this manner the system controller can update an inventory database, a batch report, and monitor the chemical formulation contained in each keg 106 at each station 104.

Keg 106 can include an internal stirrer mechanism 142 to accommodate chemicals that must be stirred or agitated prior to application. The stirrer mechanism 142 can include a stirring port 140, an example of which is depicted in FIG. 3. The stirring port 140 is coupled to stirrer mechanism 142 disposed within the keg 106. Proper stirring or agitation may be needed for certain chemicals on a periodic basis, or within a period of time prior to application. The stirrer mechanism 142 is actuated by a stirrer-motor 138 that can be electrically coupled to the station controller 130.

The system controller 102, in communication with the station controller 130, can be configured to ensure that chemical stirring or agitation only occurs at appropriate times and intervals. For example, the system controller 102 can direct the station controller 130 to prevent operation of the stirrer mechanism 142 during the application of a chemical formulation from a keg 106, thereby eliminating or reducing potential weight measurement inaccuracies at the scale 110 due to the "sloshing" or movement of the contents of the keg 106. The system controller 102 can coordinate stirring of chemical formulations at various keg stations 104 in order to optimize the availability of the chemical formulations in the kegs 106 for treatment applications. In a scenario where multiple application batches are scheduled the system controller 102 can direct the one or more station controllers 130 to activate the stirrer mechanisms 142 in a plurality of kegs 106 that are needed for a subsequent batch application during a first batch application utilizing a recipe that does not include that plurality of kegs 106.

The station controller 130 can include a timer or timing mechanism that can be configured or programmed to activate individual keg 106 stirrer mechanisms 142 at periodic or preset intervals. For example, a specific chemical at a specific keg station could require ten-minutes of stirring once every hour. A second chemical in a keg 106 mounted at a second keg station could require a one-hour period of stirring prior to application. The station controller 130 can be configured to accomplish both requirements with a periodic stirring of the first chemical every hour, and with a daily timer that activates the second keg stirrer at 7 AM, one-hour prior to beginning a programmed 8 AM batch application.

As a chemical fluid is pumped out of a keg 106 the fluid can pass through a filter 150 that can remove particulate matter before entering the pump 108. The pump 108 can then direct the fluid through an air-removal valve 144 that can prevent the formation of air pockets in a fluid line that connects the keg station 104 to the manifold 136 and ultimately to the application apparatus 200.

The system controller 102 and the station controller 130 can be coupled with a bi-directional communication channel or protocol that requires both the system controller 102 and the station controller 130 to acknowledge the other prior to the beginning of a treatment application. This configuration can provide the system controller 102 with a mechanism to verify the presence and working operation of each station controller 130 on a plurality of keg stations 104. Similarly, the loss of communication in either direction between the system controller 102 and any individual station controller 130 can cause an alert or alarm to be issued. The presence of an alert may require operator action or result in an automated pause or shutdown of a batch treatment application. Treatment can be paused or temporarily suspended by stopping each pump 108 on each station 104, as well as stopping the flow of seed into or through a seed treatment apparatus.

Figure 5:
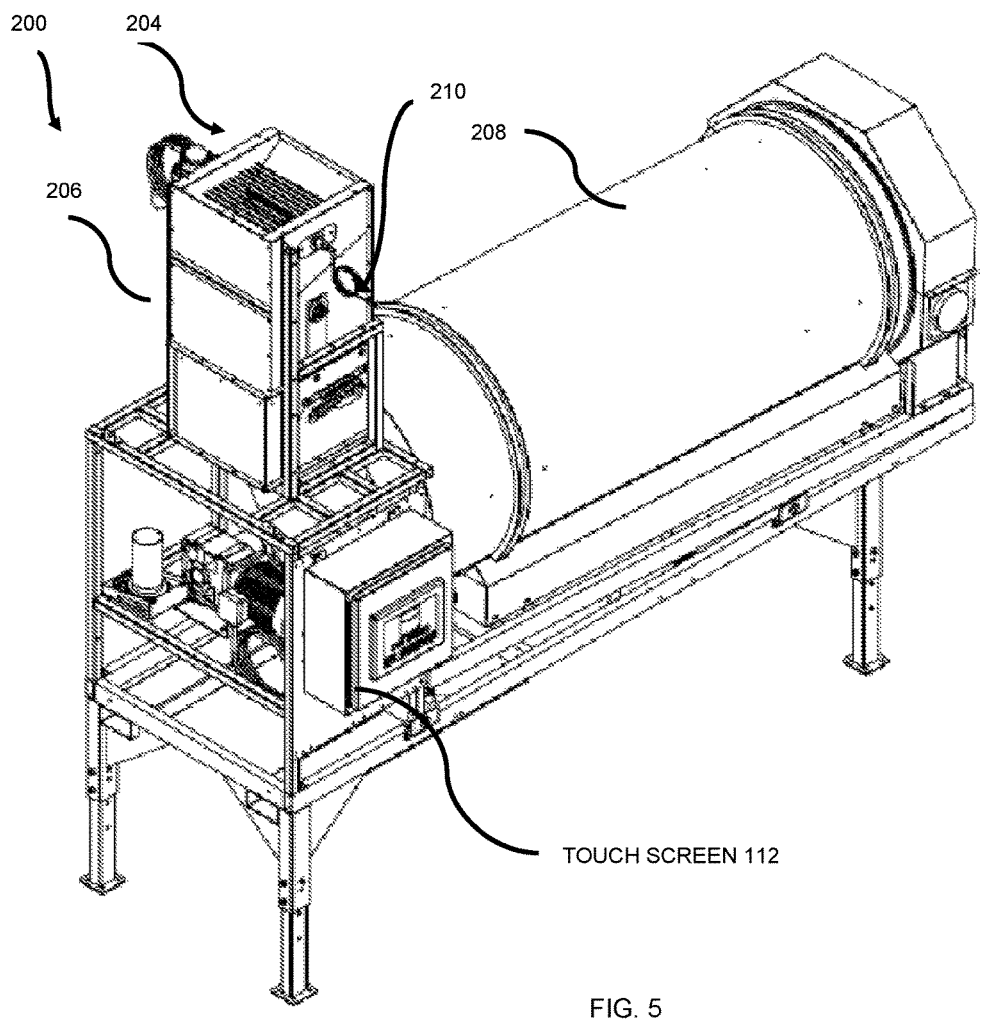
FIG. 5 depicts an exemplary embodiment of a seed treatment applicator and drum.

FIG. 5 depicts an exemplary seed treatment apparatus 200 that includes a housing 202 including an inlet 204 to a chemical applicator 206. In an embodiment chemical applicator 206 can include a seed wheel, a dispersion cone, an atomizer wheel, and an outlet connected to a polishing drum 208 or mixing chamber. The chemical applicator 206 can be in fluid communication with one or more kegs 106 containing chemical formulations for treating the seeds via an inlet tube 210. The inlet tube 210 can be coupled to a plurality of kegs 106 by a multi-port manifold 136, as depicted in FIG. 2A. The seed treatment apparatus 200 can be connected to a system controller 102 with a processor that is coupled to a control panel or touch screen 112 for monitoring or operating the system.

A seed treatment apparatus 200 coupled to a system controller 102 can be configured to proportion both amounts of seed and treatment products to the polishing drum 208 or mixing chamber in order to provide for minimal treatment product waste and consistent treatment product application. The seed treatment system 100 can include sensors, flow meters, and/or controls to monitor/control both the flow rates of the treatment products coming out of the pumps 108 and the metered volume of seeds entering or exiting the chemical applicator 206. Based upon a pre-programmed recipe system 100 can automatically adjust the flow rates of the treatment products based on the volume of seeds to be treated that are supplied to apparatus 200 at a given time in order to control the amount of treatment product applied to the seeds. Thus, if a flow sensor sensing the flow rate of the treatment products and a seed sensor sensing the volume of seeds indicate that the ratio of flow rate to volume is not within a desired amount of a predetermined optimal ratio or a range of ratios, the system 100 can automatically adjust the flow rate of seeds and/or the volume of chemical treatment product. This provides a more accurate distribution of treatment product to the seed than previously possible because the correlation of volume of seeds to amount of treatment product is consistently maintained. Additional seed-treatment apparatus disclosure is provided in U.S. Patent Publication No. 2011/0027479, herein incorporated by reference.

The exemplary embodiment of a seed treatment system depicted in FIG. 1 includes a flex-tank station 160. The flex-tank can include a water source for treatment recipes that call for the dilution of the combined chemical formulations or the addition of a solid or powdered component, such as an inoculant, that is mixed with water before seed treatment. The flex-tank can include a portal to introduce other components into the system 100 as required by the recipe or a customer's specific request. The system 100 can also include a separate water supply line that can be controlled by an electronic valve or pump, that when coupled to the system controller 102 can be used to dilute the various chemical components that are combined into a treatment formulation as directed by an individual recipe.

The fluid supply lines between stations 104 and apparatus 200 are not shown for clarity, however each station 104 includes an individual fluid supply line that is connected to a manifold input of apparatus 200. Typical input manifolds can range in size from two to twenty inputs, although additional inputs can be accommodated with larger manifolds. Manifolds can be configured such that the individual chemical formulations are thoroughly mixed together prior to deliver to a seed treatment apparatus 200 for application to a batch of seeds.

Figure 6:
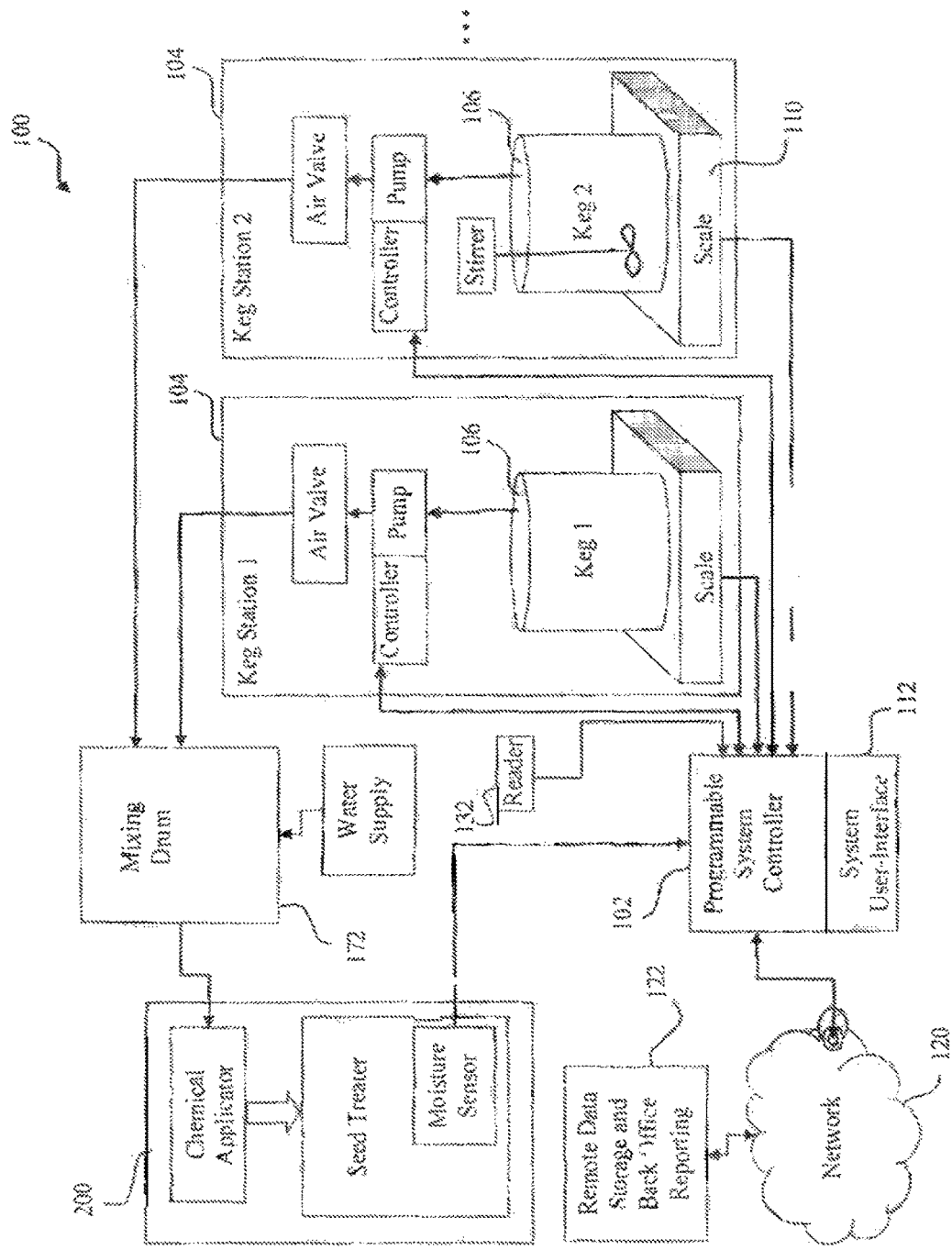
FIG. 6 is a block diagram of an exemplary embodiment of a seed treatment system that includes a pre-mix drum.

FIG. 6 depicts a related embodiment to system 100 that includes a mixing drum 172 that can receive a plurality of chemical formulations from a plurality of keg stations 104. The mixing drum 172, in one embodiment, can include a container with an optional agitator or stirrer that can hold and thoroughly mix the chemical formulations that compose a selected recipe. In one example embodiment, mixing drum 172 holds 30 gallons. The contents of the mixing drum 172 can be pumped or otherwise delivered to the seed treatment apparatus 200 for application to a batch of seeds. The mixing drum 172 can also be configured to receive, through a port, valve, or other suitable mechanism, chemical formulations that are contained in kegs or packaging that is incompatible with keg stations 104.

In one embodiment, the plurality of keg stations can be isolated from the mixing drum 172 and seed treatment apparatus 200 such that only the contents of the mixing drum 172 are supplied to the seed treatment apparatus 200. A water supply, controlled by the system controller 102, can inject water into the mixing drum 172 to achieve a desired concentration of the chemical formulations from the keg stations 104. The amount of water injected into the mixing drum 172 can also be regulated by the system controller 102, or manually by a user/operator, to control the moisture level on the surface of the treated seeds. The moisture level on the surface of the treated seeds should be maintained at a level that does not cause the seeds to clump together, possibly clogging a seed planting implement. The moisture level on the surface of the treated seeds can be monitored with one or more moisture sensors coupled to the seed treatment apparatus 200. A moisture sensor can also be included at the seed inlet of the seed treatment apparatus 200, and coupled to the system controller 102, such that the system controller 102 can adjust the concentration of the chemical formulation to be applied to the seeds based on the moisture content on the untreated seed.

The system controller 102 can also report errors or failures of the treatment application apparatus equipment 200. For example, indications of a seed wheel motor failure or indications of a drum motor failure can be reported or logged by the system controller 102. Other communications between the system controller 102 and the treatment apparatus 200 can include commands to start or stop a flow of seed or if appropriately equipped, to select one of several bins or containers of different seed varieties. In this manner a fully-automated seed treatment recipe that includes both the chemical formulations as well as the seed variety can all be controlled by the system controller 102.

The system controller 102 can deduce various errors in the operation of individual keg stations 104. For example, if a fluid supply line between the treatment application apparatus 200 and an individual keg station 104 were to become clogged or blocked such that the pump 108 was unable to draw a chemical out of the keg 106, the system controller 102 can detect the blockage. In the situation where the pump 108 being operated, the scale 110 should report a decrease in the weight of keg 106 proportional to the speed of operation of the pump 108. If no decrease in the weight of keg 106 is detected despite the operation of pump 108 an alert can be raised or the system controller 102 can stop any active batch treatment process until the blockage is removed. Similarly, if the pump 108 or pump motor were to fail or otherwise be unable to withdraw fluid from keg 106 the system controller 102 can issue an alert or alarm.

Any alert or alarm that is generated due to a failure condition detected by system controller 102 can be reported to an appropriate service provider, who can order or maintenance or repair work. These reports can be in the form of repair tickets that indicate the location, type, time and potential resolution if any, of the alert or alarm.

In one embodiment the system controller 102 can adjust the speed of a pump 108 at an individual keg station 104 to adapt to a gradual buildup of material in a filter 150 that can cause the actual flow rate of a chemical formulation in a keg 106 to decrease given a constant pump speed. In the situation where the pump 108 being operated, the scale 110 should report a decrease in the weight of keg 106 proportional to the speed of operation of the pump 108. If the decrease in the rate of change of the weight of keg 106 decreases over a period of time where the speed of operation of pump 108 is constant an alert can be raised or the system controller 102 can increase the speed of the pump 108 to compensate for the decrease in flow (rate of change of the weight of the keg) thereby maintain the treatment formulation consistency for an active batch treatment process. In this manner the system 100 can self-calibrate by correlating the speed of each pump 108 at each keg station 104 with the change in weight of the keg 106 during pump operation. The self-calibration can be combined with the density of the contents of the keg 106, obtained by the reader 132 scanning an RFID tag or barcode, to provide consistent and accurate seed treatment.

Figure 7:
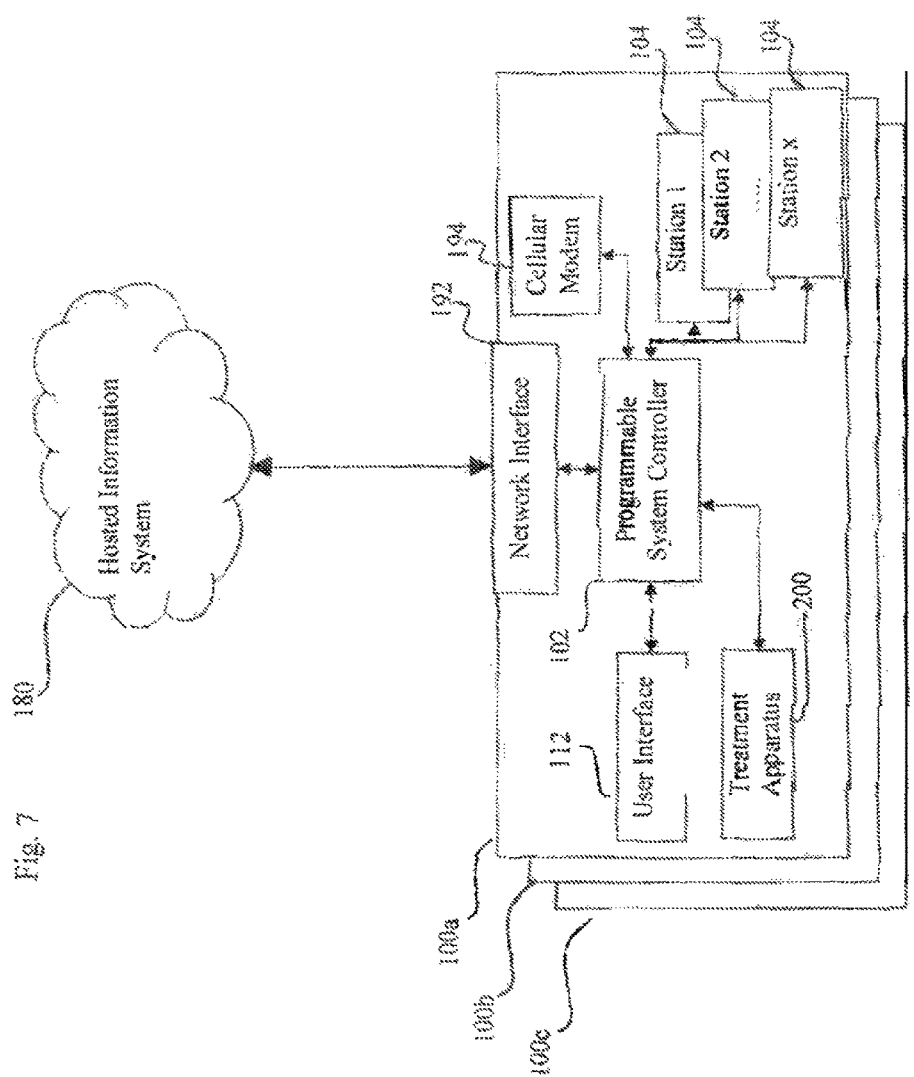
FIG. 7 is a block diagram of communications between some of the components of a treatment system and a hosted information system according to one embodiment.

FIG. 7 is block diagram illustrating an information exchange between the various components of seed treatment system 100 described above and, in addition, between a hosted information system 180 according to one type of embodiment. In various embodiments, hosted information system 180 performs some or all of the functions as remote data storage and back office reporting facility 122 described above. In addition, hosted information system 180 facilitates information exchange between seed treatment system 100 and multiple distinct parties. In one embodiment, hosted information system 180 is operated by one or more of those parties.

Seed treatment system 100 can transmit and receive a variety of electronic communications from a hosted information system 180 through a wired or a wireless network. The programmable system controller 102 can be interfaced with a wired network interface circuit 192 or a wireless network interface circuit 194, such as a LTE (e.g., 4G) modem that provides a connection to the Internet or a private network. In one embodiment, seed treatment 100 has both, a wired, and a wireless interface. For instance the wireless interface can function as a backup in case of a wired network failure. As illustrated in FIG. 7, hosted information system 180 can provide services for multiple different seed treatment systems 100a, 100b, 100c that may be located at geographically distinct locations and owned or operated by distinct seed retailer organizations.

In various embodiments, hosted information system 180 is implemented as a physical or virtual server on one or more computer systems. The one or more computer systems can be general-purpose computers having hardware of a known architecture such as a multi-core processor interfaced with RAM, a non-volatile storage arrangement such as a hard disk drive or flash EEPROM drive, system bus, input/output facilities, networking facilities, BIOS, an operating system, and a system of application programs that, together with the aforementioned components, implements a portion, or all, of the functionality of the hosted information system 180. The one or more computer systems may be arranged as a server farm, in which case the system 180 can be either virtualized or carried out on one or more dedicated machines. The one or more computer systems may be geographically distributed e.g., as a cloud model, in which case a coordinator program handles the distribution of the various operations or processes that make up system 180. System 180, or portions thereof, can also be implemented using ASP or web services technologies and other such models facilitating interoperability.

In one type of embodiment, hosted information system 180 facilitates multiple, distinct, parties to supply information for use by treatment system 100, to obtain information from system 100 relating to its operation, or both. Examples of the various distinct parties include: one or more support centers of system 100 (such as, for instance, the manufacturer or an authorized service center); one or more equipment service providers (such as a repair center, for instance); one or more suppliers of un-treated seed; a supplier of chemicals used in the seed treatment; and the seed retailer, which is oftentimes the owner and operator of seed treatment system 100 (although this is not necessarily the case such as where the operator of seed treatment system 100 is an independent operator that provides seed treatment services for the seed retailer).

Figure 8:
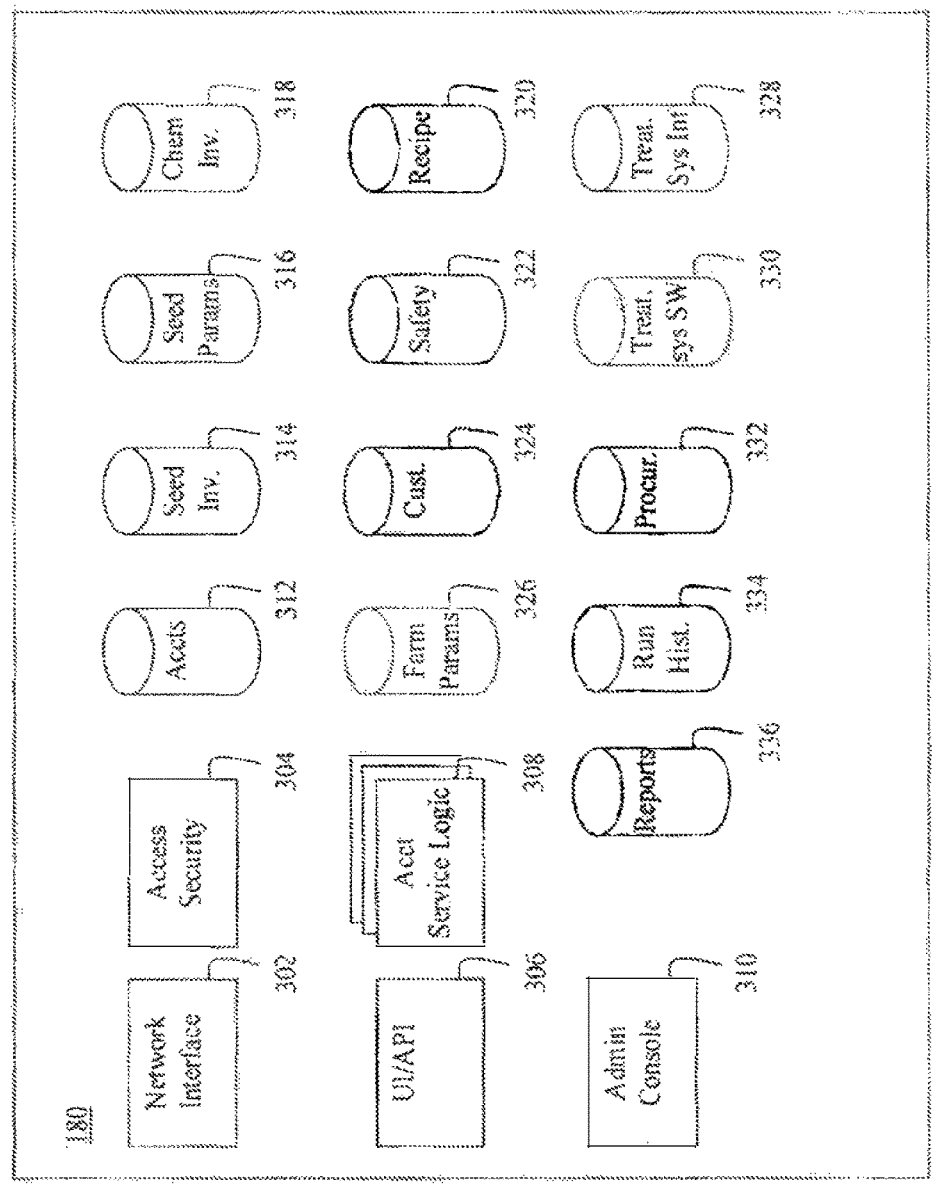
FIG. 8 is a simplified block diagram illustrating various functional components of hosted information system 180.

FIG. 8 is a simplified block diagram illustrating various functional components of hosted information system 180. Network interface module 302 facilitates data exchange with each of the parties over one or more data communications networks. Access security module 304 limits access to system 180 to only those parties that are properly authorized to have such access. User interface or application program interface module 306 provides human or machine accessibility, or both, to authorized parties. Account service logic module 308 contains the essential application program logic that implements the principle functionality of system 180, which will be described in greater detail below. In one approach, account service logic module 308 includes a series of distinct functionalities that are available to corresponding parties; thus, for instance, the seed retailer has available to it a specialized seed retailer set of functionality, whereas a chemical supplier has a different set of functionality. In this example account service logic 308 includes back-office functionality that provides data exchange functionality between the various parties. Administration console module 310 provides administrative access to system 180.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software.

In the exemplary embodiment shown, system 180 includes a plurality of databases that support various functions or services. Each of the databases can be used by one or more of the modules 302-310. Accounts database 312 stores essential account information for each party accessing system 180 such as access credentials, permissions, configuration information, and the like. Each owner/operator of each respective system 100 that is serviced by system 180 has a corresponding account as well corresponding to the seed treatment system.

Seed inventory database 314 represents the un-treated seed received at each retail location, as well as treated seed inventory if applicable. Each lot of seed is indexed with a unique identifier and includes a unit of measure, such as weight. Seed parameter database 316 stores detailed information on each seed lot of pre-treated seed, including variety, source, moisture content, and the like. This information is provided by the seed supplier, or can be entered by the retailer or another party based on independent testing of seed samples from each lot.

Chemical inventory database 318 stores information pertaining to the various kegs of chemicals that are on-hand at the seed retailer facility. This database can also keep track of the current quantity of each chemical that is being utilized such that a real-time indication of chemical quantity and rate of use is available to certain parties such as the chemical supplier and retailer. The chemical inventory is also lot-specific, and can even be keg-traceable. Chemical inventory information can be provided by each respective chemical supplier, and can be automatically updated by the corresponding seed treatment system 100 as the chemicals are consumed in processing.

Recipe database 320 maintains detailed information describing the available formulations and recipes that can be carried out by each system 100 that is serviced by system 100. Recipe information can be provided by the seed supplier(s), by the chemical supplier(s), by the seed treatment system operator (i.e. retailer), or another party. In a related embodiment, recipe database 320 includes a first portion that stores authorized recipes and formulations that are available to be selected by the seed treatment systems 100, and a second portion that stores pre-authorized or proposed recipes that are subject to a review/approval process.

In another related embodiment, recipe database 320 includes adjustment logic for making adjustments or corrections to formulations or recipes based on additional criteria such as seed parameters, current environmental conditions, farm-specific parameters such as soil type, pests, etc., weather forecast information, and any other parameters that can affect the performance of the treated seed. When applying the adjustment logic, information from other databases is queried to obtain the necessary input parameters to execute the formulation or recipe adjustment.

Safety information database 322 stores material safety data on chemicals as well as constraint information that defines predetermined limits on concentrations of chemicals, prohibited combinations of chemicals, limitations on what types of chemicals or cocktails are prohibited for certain seed types or varieties, and the like. Essentially, safety information data base 322 maintains rules and restrictions that prevent dangerous or merely wasteful or otherwise undesirable results from being inadvertently achieved due to improper formulation or recipe selection or other mistake. Safety information can be provided by the chemical suppliers, the seed suppliers, or other parties. In a related embodiment, account service logic 308 includes a reconciliation function that compares various safety constraints provided by various parties and establishes clear limits on all recipes. Also, since one party's safety constraints might affect the recipe definition of another party, the reconciliation function provides alerts and information exchange to allow the various parties to discuss their potentially inconsistent constraints to arrive at a consensus on certain formulation or recipe limits.

Customer database 324 stores information relating to end purchasers of treated seeds and their purchase histories, by batch. This data can be further updated with yield information and other follow-up data supplied by the end-customers to help fine-tune or more radically adjust recipes and seed variety recommendations for each customer. Farm parameter database 326 includes specific details on the fields in which treated seeds are to be planted. Thus, for instance, soil composition, acidity, elevation, pests, and other relevant parameters can be accounted for when selecting or adjusting a customer-specific recipe.

Treatment system information 328 includes all relevant details for each seed treatment system 100 that is supported by system 180, including equipment configuration, and the like. Treatment system software database 330 includes current software that should be running on each controller 102 of each treatment system 100. Software updates and system restoration points are supported. Procurement information 332 relates to suppliers of chemicals and seed, and can include contract terms, pricing, etc., for replenishment transactions which may be automated in some embodiments based on forecasts and current consumption trends.

Run history database 334 maintains records of the parameters representing each process batch of seed treatment systems 100. These master records can include information such as chemical utilization, power utilization, other performance measures, alerts, errors, system messages, kegs identifiers from which individual chemicals were drawn, seed lot and quantity information, environmental condition data such as temperature, humidity, and the like, process parameters and adjustments, and all other relevant batch-specific history. Reports database 336 contains report form data on which reporting functionality is based, as well as records of completed reports to various parties in association with each seed treatment system 100. Specialized reports can be generated for individual parties, such as chemical suppliers, seed suppliers, operations service support providers of systems 100, retailers, etc.

Figure 9:
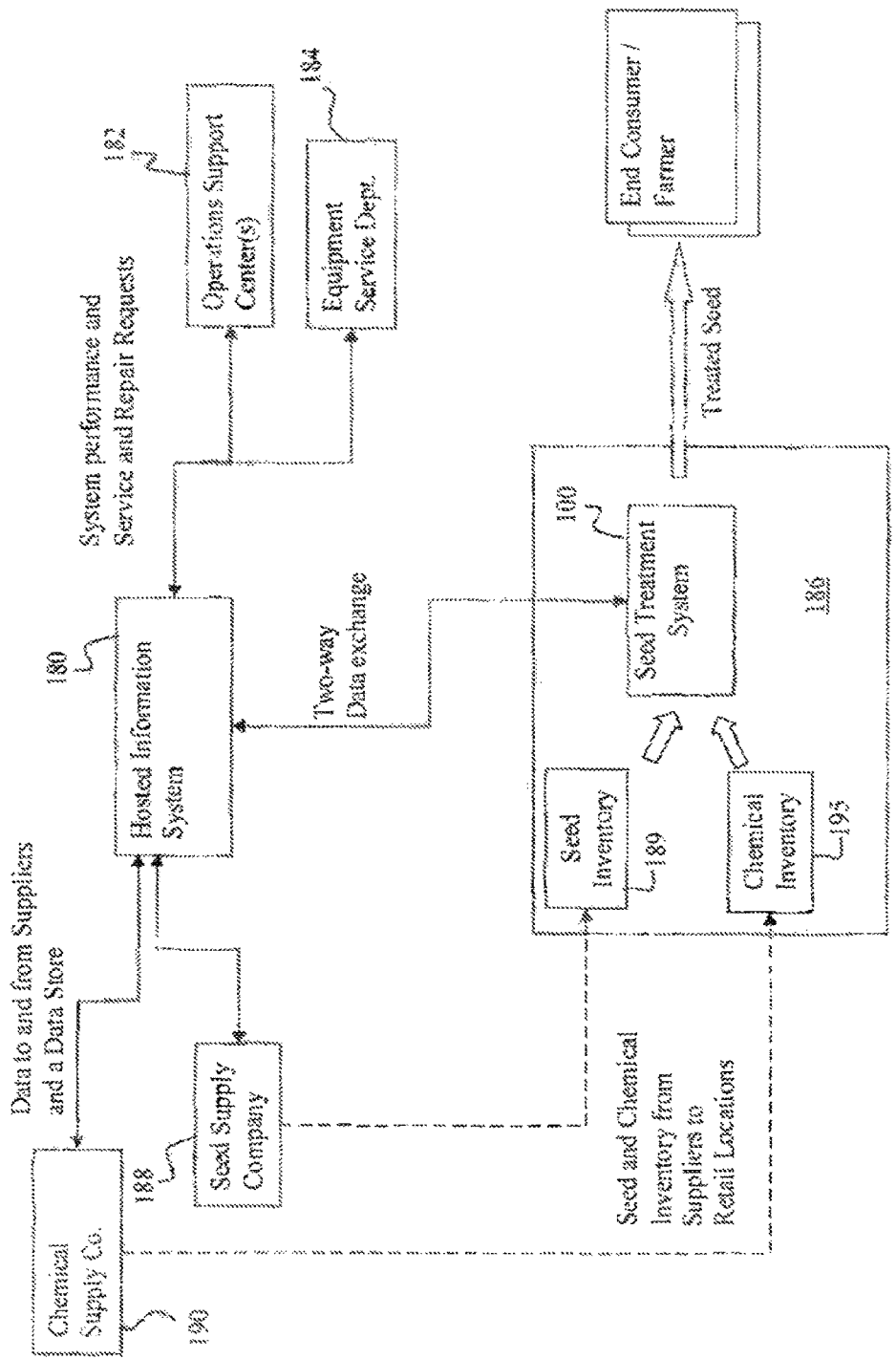
FIG. 9 is a block diagram illustrating communication and product flow between retail locations, suppliers, and consumers according to an embodiment of the invention.

FIG. 9 depicts examples of separate organizations that transact, and exchange information, with an individual seed retailer 186 equipped with a seed treatment system 100. Individual transactions can be logged by the system 100 and held locally in an internal database on computer readable storage coupled to the system controller 102. The transactions can also be reported to the hosted information system 180 in real-time or in periodic communication or synchronization intervals. Examples of transactions include receipt of seed or chemical treatment inventory, replenishment orders, seed treatment forecasts, and seed treatment application information for individual batches.

This communication with hosted information system 180 can include software updates, transaction data, alert messages or alarms, and data related to a master database of recipes and formulation information. Additionally, other entities such as an operations support center 182, an equipment service department 184, individual seed supplier companies 188 can all transmit and receive data from the hosted information system 180 as appropriate.

In one type of embodiment, generally, information that is sent by seed treatment system 100 to hosted information system 180 is operational information relating to status and operational history of system 100. Operational data can include such data items as seed treatment system parameter information, run history information, current status information, material usage information, and the like. Likewise, in a general sense, information received by system seed treatment system 100 from hosted information system 180 is material handling data that relates to how system 100 tracks material inventories, conducts seed treatment, and the like. Material handling data in this sense can include such data items as inventory, recipe, formulation, seed parameter, safety information, and the like.

In a related embodiment seed treatment system 100 exchanges transactional and downstream information relating to sales of material to the operator of system 100, retail sales of treated seed to end-customers, and finished product performance, as reported back by the end-customers. In another related embodiment, seed treatment system 100 transmits locally-obtained data for storage at hosted information system 180, which may or may not be used to exchange with other parties, such as certain end-customer-specific data, operator-entered data such as recipes, and the like.

In another related embodiment, seed treatment system 100 serves as an entry point for proposed formulations and recipes, as entered by the retailer-operator via user interface 112. This proposed recipe information is sent to hosted information system 180, where it is made available to an approval entity, which can be the chemical supply company 190, seed supply company 188, or operations support center 182 (or a combination of these entities). The proposed information may be stored in treatment system information database 328 or in a non-approved section of recipe database 320 according to various embodiments. Subsequently, the approval entity either accepts, rejects, or modifies the proposed recipe or formulation. Modified and accepted formulations, are then published as available recipes in recipe data base 320, for example. In one particular embodiment, the submission and approval process is automated by being carried out under program control, where portions of the processing are carried out by account service logic module 308, and portions of the processing are carried out by a data processing system at the approval entity.

In a related embodiment, the entire recipe submission, review, and approval process is carried out by hosted information system 180. In this approach, the safety and constraint information stored in database 322 is read and applied by an approval function of account service logic 308. In this regard, hosted information system 180 provides not only information exchange services, but also decision system services. Thus, according to various embodiments, hosted information system 180 processes the data received from each seed treatment system 100, in combination with information received from the chemical and seed suppliers, and from operations support center 182.

In various embodiments, a chemical supplier 190 can transmit recipe information, material safety-related information, along with process requirements data, such as specifications or constraints on chemical mixtures, concentrations, lot codes, and the like. Additionally, chemical supplier 190 or operations support center 182 can receive from system 100 process logs and performance-related information, or other results information via hosted information system 180. In a related embodiment, chemical supplier 190 can obtain feedback information based on crop growth performance for individual end customers (farmers) or in various aggregated combinations, such as those based on formulation/recipe, farm parameters, seed variety, etc.

At least one chemical supply company 190 provides the chemical inventory 195 to be used for seed treatment to seed retailer 186. One or more seed suppliers 188 each provides seed inventory 189 seed retailer 186. Chemical inventory 195 and seed inventory 189 can be scanned, recorded, and confirmed electronically at the retail location 186, and this information can be updated to hosted information system 180.

In one embodiment, seed treatment system 100 includes a provision to facilitate tracking of the various inventories. In one example, a bar code reader or RFID inventory control system is coupled to system 100. These types of input devices can identify each keg 106 that is delivered as part of the chemical inventory 195. Similarly, each seed lot delivered as part of seed inventory 189 can be tracked using barcode or RFID technology. This information is then transmitted to hosted information system 180. The chemical and seed suppliers can access the inventory data stored in the hosted information system 180 through their respective accounts in system 180.

Figure 10B:
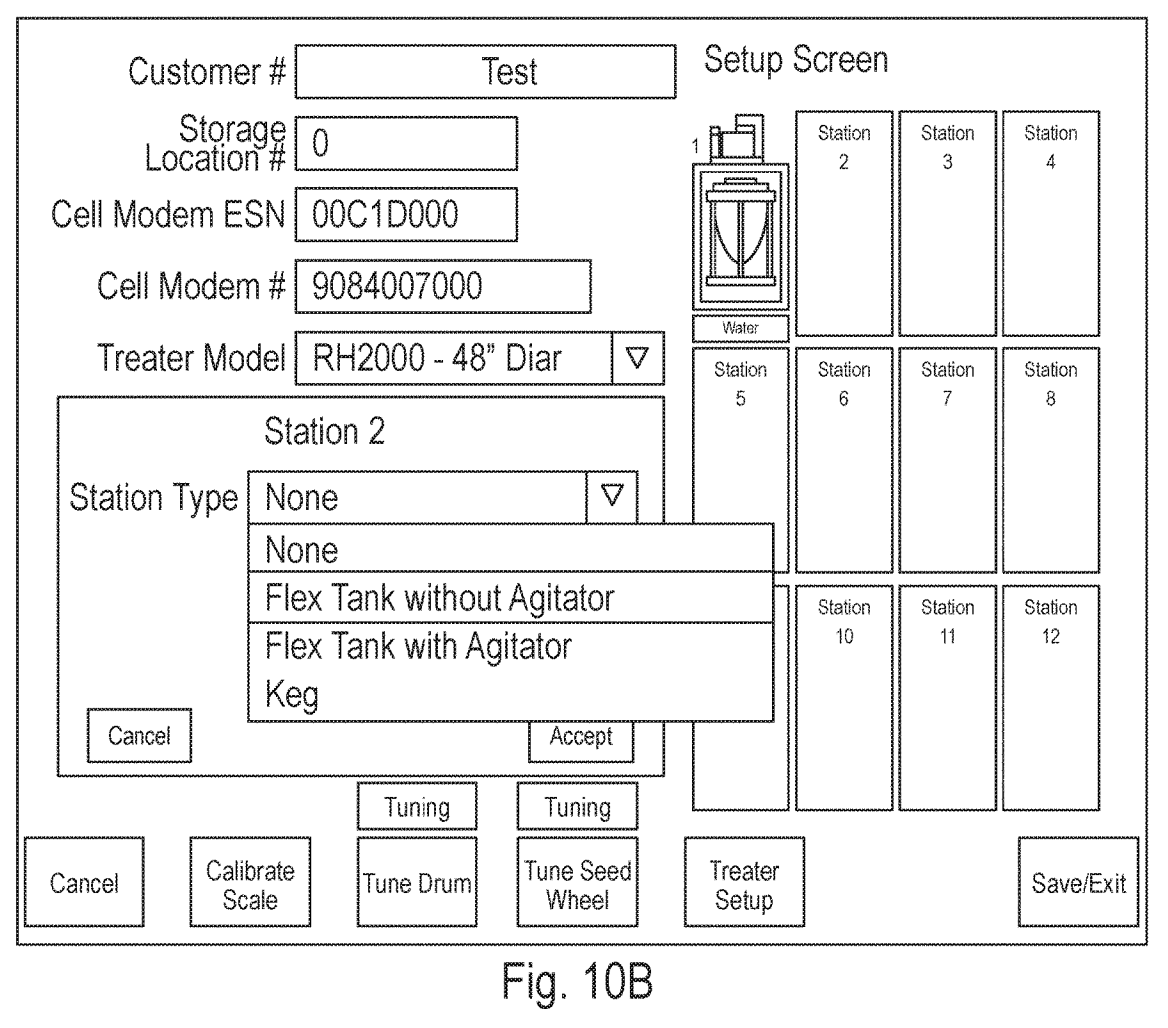

FIGS. 10A-10C depict exemplary seed treatment system pump detail screens. Each station 104 can be configured with information related to the type of chemical formulation that will be contained in a keg 106 at each station. This configuration allows the system 100 to check that a correct replacement keg is installed at the station by verifying that the keg bar code data for the replacement keg matches the data associated with the previously used keg. In an a related embodiment the bar code data field is replace with RFID data. This screen also provides the option to calibrate, or zero, the scale when kegs are replaced or swapped.

FIG. 10D depicts an exemplary detail screen that can provide an interface to configure a flex-tank station. A flex-tank station can accommodate water or slurry composition as depicted, or, for instance, a specialized chemical formulation that is unavailable in a keg or drum form factor. In either case the user can input the density of water or the specialized chemical formulation to ensure accurate application of the flex-tank contents based on the measured weight of the contents. The density of the chemical formulation can be entered manually, if known, or populated automatically when scanned from a barcode or other tag affixed to an individual keg when it is placed at a keg station.

Figure 10E:
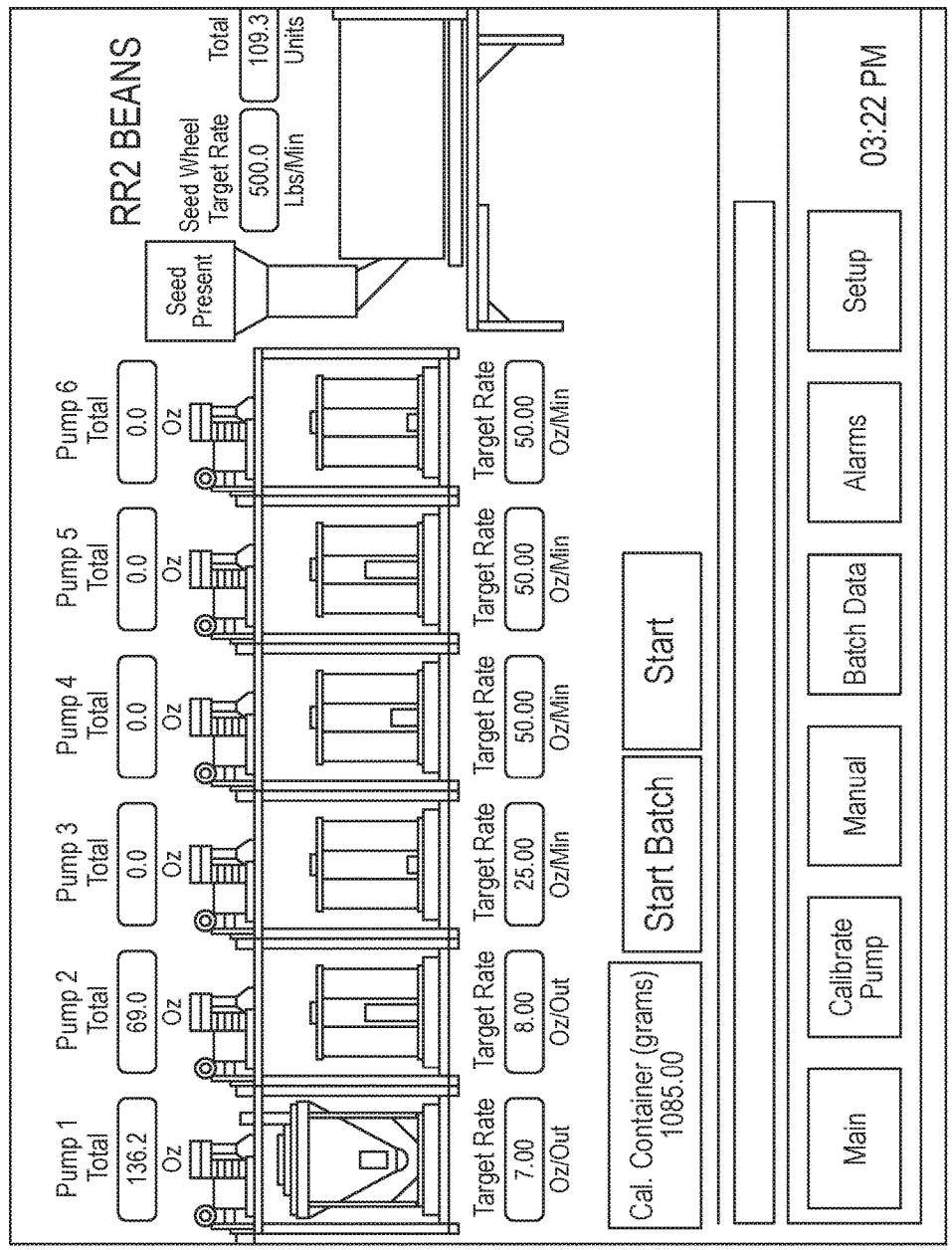
FIG. 10E depicts an exemplary seed treatment system multi-station status screen according to one embodiment.

FIG. 10E depicts an exemplary seed treatment system multi-station status screen. This screen depicts the amount of fluid pumped from each station 104, the target flow rates for each station 104, the approximate volume of fluid remaining in each keg, and the target rate for the seed wheel. Additionally this screen indicates that seeds are present in a hopper that provides untreated seeds to the seed treatment apparatus 200. A lack of seeds in the hopper can indicate the end of a batch or cause an alert directing the operator to introduce additional untreated seeds before continuing the chemical application.

An embodiment of the present invention provides for the reclamation of kegs 106 and any chemical residue or unused formulation contents upon the substantial depletion of the chemical formulation. By recording the weight of the original contents in a full keg 106 prior to use, monitoring and recording the use of the chemical formulation through continuous or periodic weighing during the application, and recording the weight of a keg 106 upon its removal from a station 104 and return to a processing facility can provide for the verification of keg integrity, and the content formulation quality. The recycling or reclamation of the keg 106, the keg stirrer components and/or any keg port or valve components can reduce the overall cost of chemical formulation distribution. Environmental protection through proper handling of the keg 106 and its contents through the distribution cycle from filling, delivery, use, return and reclamation is provided by an embodiment of the present invention that includes the tracking of each individual keg 106. The tracking of each keg 106 can be accomplished by maintaining an inventory database of each keg 106 that includes a location and a unique identifying number, bar code, or RFID tag data, for each keg 106. Loss prevention of excess chemical and kegs can be tracked, monitored, and remedied because a complete audit trail of the location of each keg 106 and its contents is maintained.

An embodiment of the present invention includes a method of tracking the use of a chemical formulation by providing a varying nominal quantity of chemical formulation in each keg or container and recording that nominal quantity in each container. For example a chemical provider can fill a container, the container having a unique identifier and an actual capacity greater than an indicated capacity, with a nominal amount of a chemical formulation above the indicated capacity and record an original weight of the container and the chemical formulation in the container. By recording the unique identifier and the original weight of the container the chemical provider can maintain a database of information including the precise amount of chemical formulation that was prepared and distributed in the container to a customer.

The use of an embodiment of a chemical application system, such as seed treatment system 100, can provide the chemical provider with a mechanism to remotely monitor the withdrawal of the chemical formulation from the container and record a quantity of the chemical formulation withdrawn from the container by monitoring the change in weight of the container as the chemical formulation is withdrawn. Upon receipt of the returned container after the quantity of the chemical formulation is withdrawn from the container the chemical provider can again weigh the container and record a received weight of the container and any remaining amount of the chemical formulation in the container. By comparing the received weight of the container and the weight of the quantity of the chemical formulation withdrawn from the container to the original weight of the container the chemical provider is able to determine if the chemical formulation was tampered with, spilled, diluted, or otherwise used in a manner inconsistent with the environmental or contractual requirements.

The generation of a report including the unique identifier of the container, the chemical formulation, the customer, the distributor, the original weight of the container, the nominal amount of a chemical formulation, the withdrawn quantity of the chemical formulation, and the received weight of the container can provide an audit trail that enables an investigation of any irregularities in the handling or use of the chemical formulation.

Embodiments can provide instructions that discourage any manual access to liquid seed treatment chemicals, such as by opening and manually pouring the chemicals out, thereby reducing the likely hood that any chemical is spilled or contaminated. Instructions can be provided to maintain a closure on the kegs when not placed on a keg station and coupled to an appropriate quick-connector.

Figure 11:
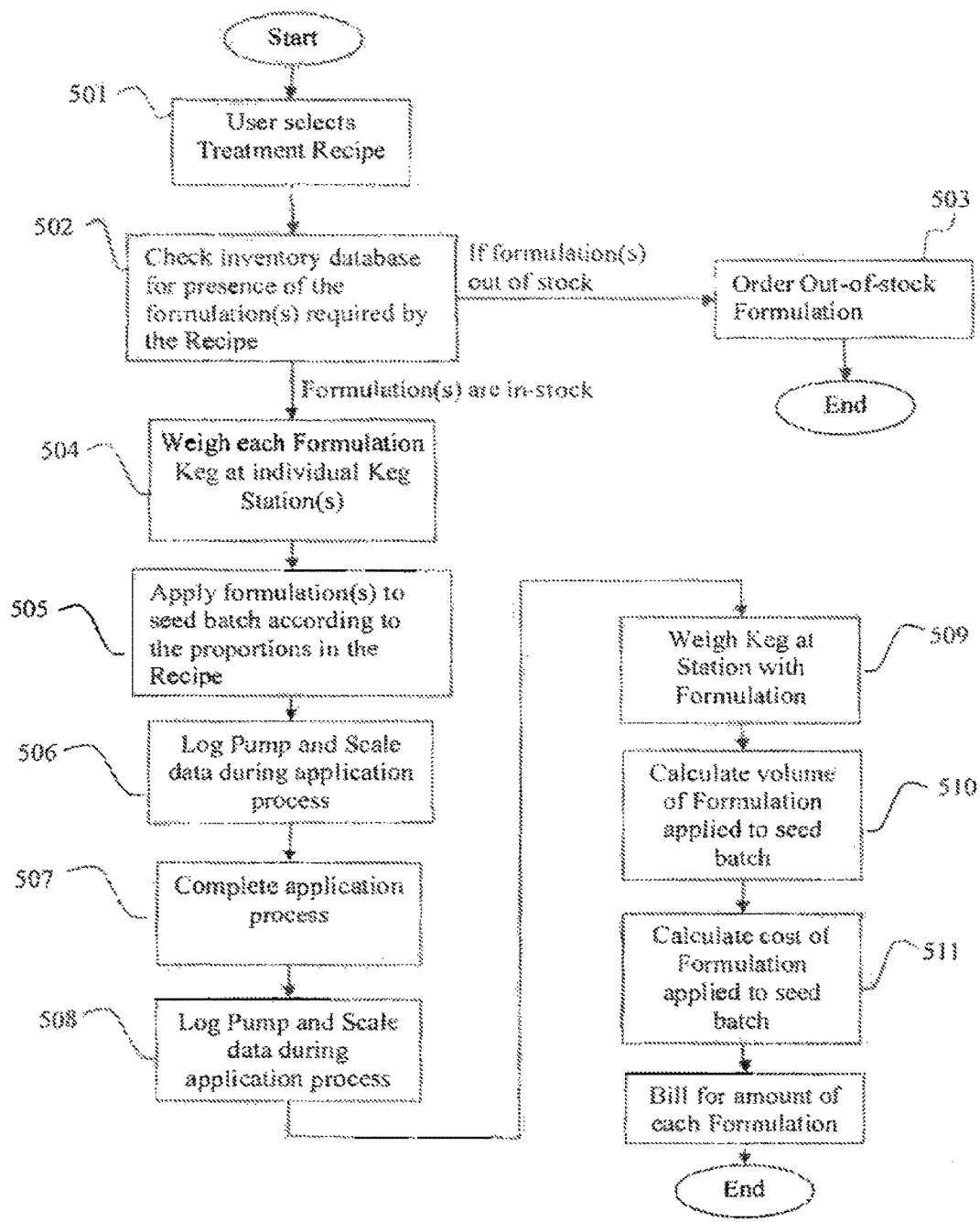
FIG. 11 is a flow diagram depicting an exemplary dynamic application and adaptation of a treatment process according to one embodiment.

FIG. 11 depicts an exemplary flow diagram of a process to treat a batch of seed for an end customer and appropriately bill that customer for only the amount of treatment chemical that was actually applied to the end-customer's seeds. Various operations in the sale and billing of the chemical components utilized in a seed treatment batch include:

A user selecting a treatment recipe.

An inventory check in the local database is performed for presence of the formulation(s) required by the Recipe.

If formulation(s) out of stock that formulation is ordered and the sale is postponed until the necessary components are in-stock or an alternate recipe can be selected.

Upon the selection of a recipe with sufficient stock on hand, each formulation keg at each individual keg/pump station is weighed and the weights are recorded in a database.

The formulation(s) are applied to the seed batch according to the proportions specified in the selected recipe.

During the application process the pump and scale data from each station are logged.

If a keg-swap is required to replace an emptied keg during application, the application process can be suspended during the swap, or utilize a second keg station setup to supply the same chemical formulation.

Upon completion of the application process the final pump and scale data are again logged, recording the weight of each keg at the station and resulting weight of the formulation applied to the seed batch.

The volume of the formulation applied to seed batch is calculated along with the corresponding cost of the formulation.

A bill is generated for amount of each chemical formulation and for the total cost of the recipe applied to the batch of seeds.

Figure 12:
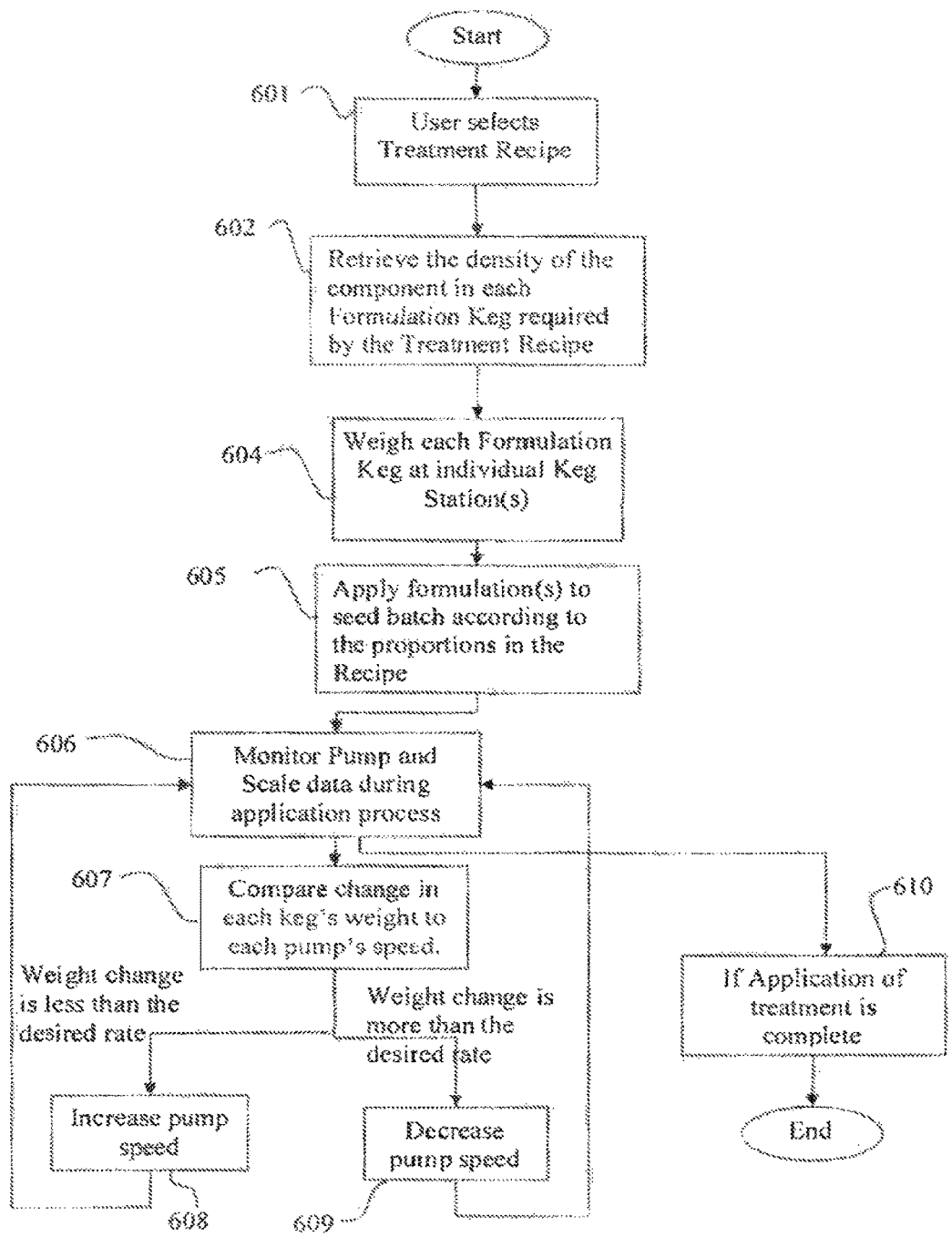
FIG. 12 is a flow diagram illustrating an adaptive pump rate algorithm according to an embodiment of the present invention.

FIG. 12 depicts an exemplary flow diagram of a process to adjust the flow rate of each individual pump during the treatment application process. Various steps in automatic adjustment of an individual chemical component treatment rate can include:

Retrieving the density of each component in a treatment recipe from an individual keg or a user entered value.

Weighing each keg containing a component required by the treatment recipe.

Applying each component at a rate specified by the treatment recipe.

Monitoring the change in weight of each keg during the application process

Utilizing the retrieved density information, comparing the change in weight of each keg to the expected component application rate and the speed of the pump Adjusting the pump speed until the application rate specified in the treatment recipe is achieved.

Continuing to monitor the treatment rate of each component during the entire treatment application process.

In one embodiment the process depicted in FIG. 12 can include adjusting a rate at which water is mixed with the individual treatment components to control the concentration of the treatment formulation. The rate of water injection can be adjusted in response to an increase or decrease of the rate of seeds flowing through the treatment apparatus, to the relative humidity of the environment as sensed by a weather station component, to moisture readings obtained from seeds entering or exiting the seed treatment apparatus, or in response to an operators commands to manually increase or decrease the moisture content of the seeds emerging from the seed treatment apparatus.

Figure 13:
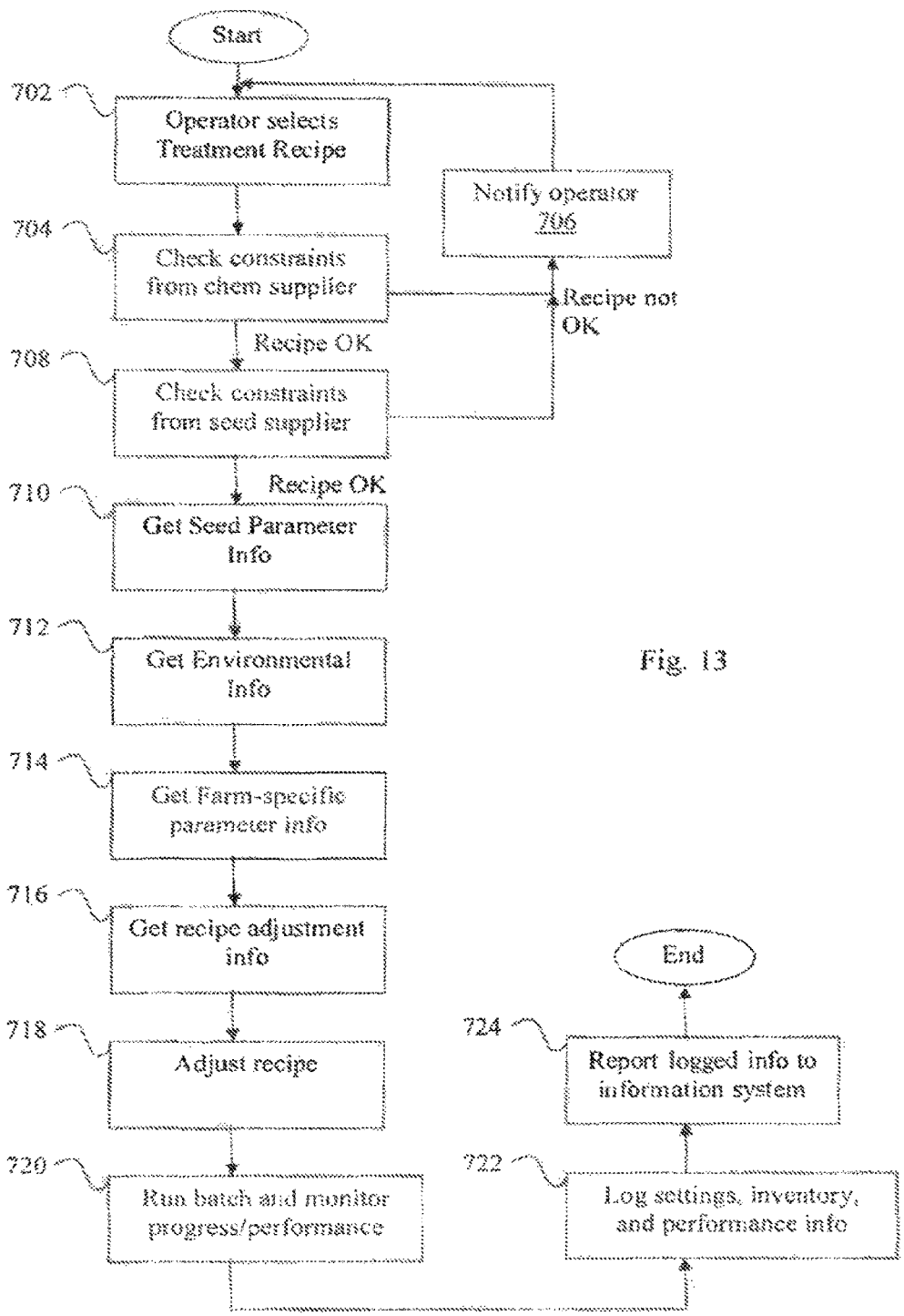
FIG. 13 is a flow diagram illustrating the use of externally-supplied data from various sources by a seed treatment system according to one embodiment.

FIG. 13 is a flow diagram illustrating the use of externally-supplied data from various sources by a seed treatment system 100 according to one embodiment. At 702 the operator of system 100 selects a treatment recipe. The selection of the treatment recipe can be based on an end-customer's request for a particular seed preparation. The recipes from which the selection is made can be pre-configured in system 100 or in system 180 based on recipe or formulation definitions provided by chemical supplier(s) or seed supplier(s). According to one particular embodiment, the seed treatment system 100 obtains the supplied recipe definitions via system 180. Alternatively, the selected recipe may be an operator-defined recipe.

At 704, system 100 checks the applicable constraints for the formulation and recipe based on constraint information provided by the chemical supplier. If the recipe selection is not acceptable, the operator is notified at 706 and the recipe is not permitted to be used in a treatment batch run. The process returns to the recipe selection block 702. If, on the other hand, the selected recipe satisfies the constraints of the chemical supplier, then the process continues to 708, where additional constraints provided by the seed supplier are checked. The seed supplier constraints must be met for the process to proceed.

At 710, seed treatment system obtains seed parameter information based on data provided by the seed supplier in association with the current lot of seeds, or on data provided by a third party evaluator (or both). In one particular embodiment, the seed parameter information is supplied to system 100 via hosted information system 180. At 712, treatment system 100 obtains environmental information relating to the present conditions. This information can be obtained via sensors present at the retail site where system 100 is located, or from another source, such as a weather station situated in the vicinity but not necessarily at the precise location of treatment system 100. At 714, system 100 obtains farm-specific info. This information may be provided by the end-customer who is purchasing the to-be-treated seed, or from hosted information system 180, which could have had the farm-specific information pre-entered. At 716, system 100 obtains recipe adjustment information, which may be in the form of a formula for adjusting concentrations of the various components of a given formulation or recipe parameters based on the input parameter values obtained at 710-714. Recipe adjustment information can be obtained via system 180. The adjustment information may have been supplied by the supplier of the selected recipe and may have been associated with that particular recipe. Thus, the various adjustment formulas may be recipe-specific according to some embodiments.

At 718, system 100 applies the recipe adjustment logic to obtain a final recipe to be executed for the particular batch to be run. At 720, that batch is run while its progress and performance is monitored. The progress and performance monitoring can include such operational parameters as: a weight of chemical pumped from each container, a duration of time the pump of each pump station was in operation, an average speed of the pump of each pump-station during operation, pumping accuracy based on multiple measurements of volumetric flow and mass transfer, for instance, and a quantity of chemical applied to a batch of seed.

At 722, the input settings for the batch, the use of chemical and seed inventory, and the monitored operational information is logged by system 100. At 724 the logged information is reported to hosted information system 180 for incorporation in the run history and for further reporting to other parties such as the chemical supplier or operations service provider for system 100.

Another aspect of the invention is directed to generating proper labels for chemicals. Crop seeds can be treated with a variety of components or formulations such as fertilizer, herbicide, fungicide, insecticide, or any of a variety of combinations of these chemicals, typically along with a colored dye or other indicator that the seed is treated. A seed treatment recipe or combination of formulations can vary due to the needs of a farmer who will plant the seed, the type of seed, and the seed-growing environment. Environmental factors can include the geographic planting region, soil types, the potential presence of specific plant diseases or pests, climate, growing season, etc. A farmer may need to account for some or all of these variables when selecting seeds and requesting seed treatments prior to planting.

Treated seeds must be labeled to reflect the use, handling, and warning instructions associated with the treatment component or formulation. Traditional treatment labels for seed treatment components can include precautions that must be taken to ensure the procedures and precautions that should be used for the safe handling of seeds treated with the treatment components, as well as first aid instructions or physician notes that may apply if exposed to the treatment components.

Due to the variety of seed types and chemical treatment formulations that are available it is not efficient or necessarily practical to produce or maintain an inventory of treated seeds with all possible combinations of seed and seed-treatments, that are be desired to accommodate the widest possible variety of seed-treatment requests. Therefore, it is advantageous to a seed retailer to be able to treat a wide variety of seeds with any of a number of chemical treatment formulations at the retailer's point of sale in an on-demand fashion. However, the use of customized seed treatment formulations creates a need to manage and prepare the production of warning labels that are appropriate for each customized seed treatment formulation.

Embodiments of this aspect of the present invention are directed to a customized warning label generation subsystem and methods of dynamically generating warning labels. Embodiments of this aspect of the present invention can be used for any type of application, but are particularly useful for seed treatment entities such as retailers that treat, sell, and distribute seeds locally to farmers. Embodiments of this aspect of the present invention can provide customized warnings for each batch of treated seeds based on the detailed chemical application data.

In an embodiment of this aspect of the present invention, a user terminal can present a user with a plurality of component chemicals that can be selected as part of a chemical formulation. Each component chemical may require a specific warning label or handling instructions depending on its unique chemical properties. A database of warning label components and handling instructions can be included on a tangible computer readable medium, such as in a centralized database that can be periodically updated or revised. Once a user has selected one or more component chemicals for the chemical formulation, a computer processor can interrogate the centralized database and generate a label that includes the appropriate handling instructions and warnings for the chemical formulation based on the severity or priority of the individual chemical component's properties.

In an embodiment of this aspect of the present invention, application of one or more seed treatment formulations, either alone or in a mixture with each other, as defined by a treatment recipe, are metered by individual pumps that are controlled electronically via a programmable electronic control panel. The electronic control panel can include a unique and custom-programmed controller or computer that "drives" or operates a treatment system based on one of a variety of entered chemical treatment recipes. The controller is configured with software to also oversee or monitor all processes during treatment, including the rate and quantity of each chemical treatment formulation that is applied to the seed as well as the rate the seed flows through the treatment apparatus. During the seed treatment process, the controller software can be configured to send or receive data from a control center or remote server. The data can include, for example, reports on each batch of treated seed, the amount of chemical treatment formulation utilized by the treatment process, requests for warning data for individual chemical treatments, requests for specific chemical treatment warning data based on the use of the chemical treatments in the formulation, or new or updated treatment recipes or chemical formulation data. The electronic control panel can include a printer or label maker that can generate chemical warning labels that are customized for each batch of treated seed based on the chemical treatment warning data and the application of the chemical treatments as directed by the controller.

In one embodiment of this aspect of the present invention, the control panel of the treatment apparatus can be linked over a computer network, such as, for example, the Internet or a cellular telephone network, to allow different parties to receive data from, or provide updates to, the system. In this manner, a chemical production or supply company can communicate with an embodiment to update, recall, or change any one of the plurality of different chemical treatment warnings in the system that correspond to component formulations supplied by the chemical company.

Embodiments of this aspect of the present invention also have application in areas other than seed treatment, such as applications where a precise custom blending of liquid products require one or more warning labels, instructions for use, handling instructions, spill abatement guidelines or other documentation. For example, if two chemicals have differing levels of toxicity they may have separate instructions for handling, contamination precautions, or other warnings that are not necessarily identical. According to an embodiment of this aspect of the present invention, when the two chemicals are combined in a solution a customized warning label that includes the appropriate instructions, precautions or warning can be prepared to label a container with the combined solution. Often this customized warning label will include the warnings and the instructions for the most toxic or volatile of the two or more solutions, although a customized label with warnings that are specific only to the combination of the two or more solutions can also be generated.

Figure 14:
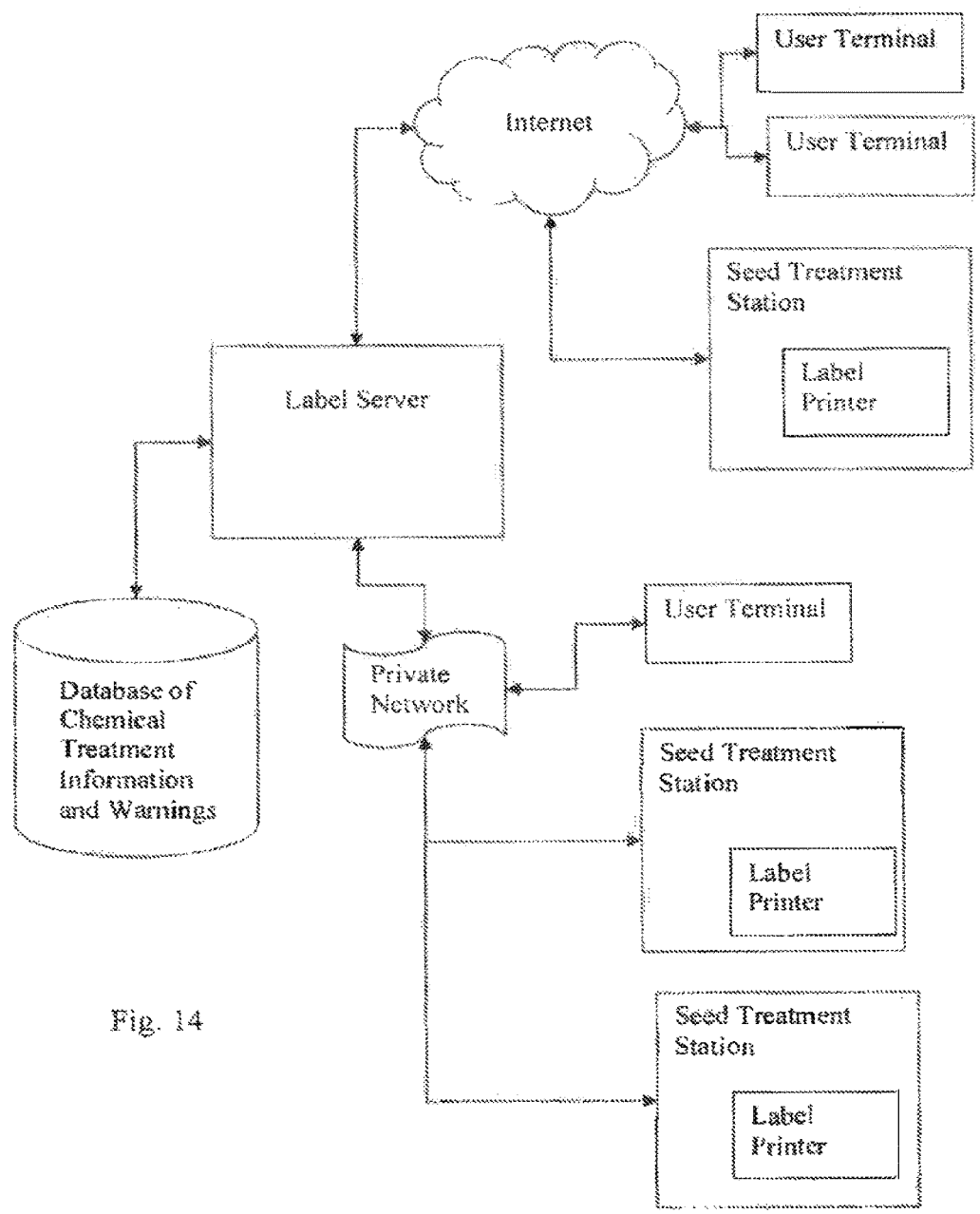
FIG. 14 depicts a high-level block diagram of warning label server and database coupled to a plurality of user terminals and seed treatment stations via the Internet and a private network, according to an embodiment.

Referring now to FIG. 14, an embodiment of this aspect of the present invention of a customized warning label generation subsystem that is capable of dynamically displaying and generating warning labels for individual seed treatment formulations is depicted. Embodiments of a label generation subsystem can be used for any type of application, but is particularly useful for seed treatment entities such as retailers that utilize an automated seed treatment station to treat, sell and distribute seeds locally to farmers.

The subsystem depicted in FIG. 14 can provide customized warnings for each batch of treated seeds based on the detailed chemical application data that is stored in a database of chemical treatment warnings. This database can be centrally located and maintained by a label server that can be communicatively coupled to the Internet or to a private network. Individual seed treatment stations can be communicatively coupled to the label server. By retrieving label information for each chemical component that is utilized in a seed treatment formulation, a seed treatment station equipped with a label printer can generate a warning label for each batch of treated seed that is customized according to the chemical formulation applied to that batch of seed.

Each component chemical may require a specific warning label or handling instructions depending on its unique chemical properties. A database of warning label components and handling instructions can be included on a tangible computer readable medium, preferably in a centralized database that can be periodically updated or revised.

Figure 15:
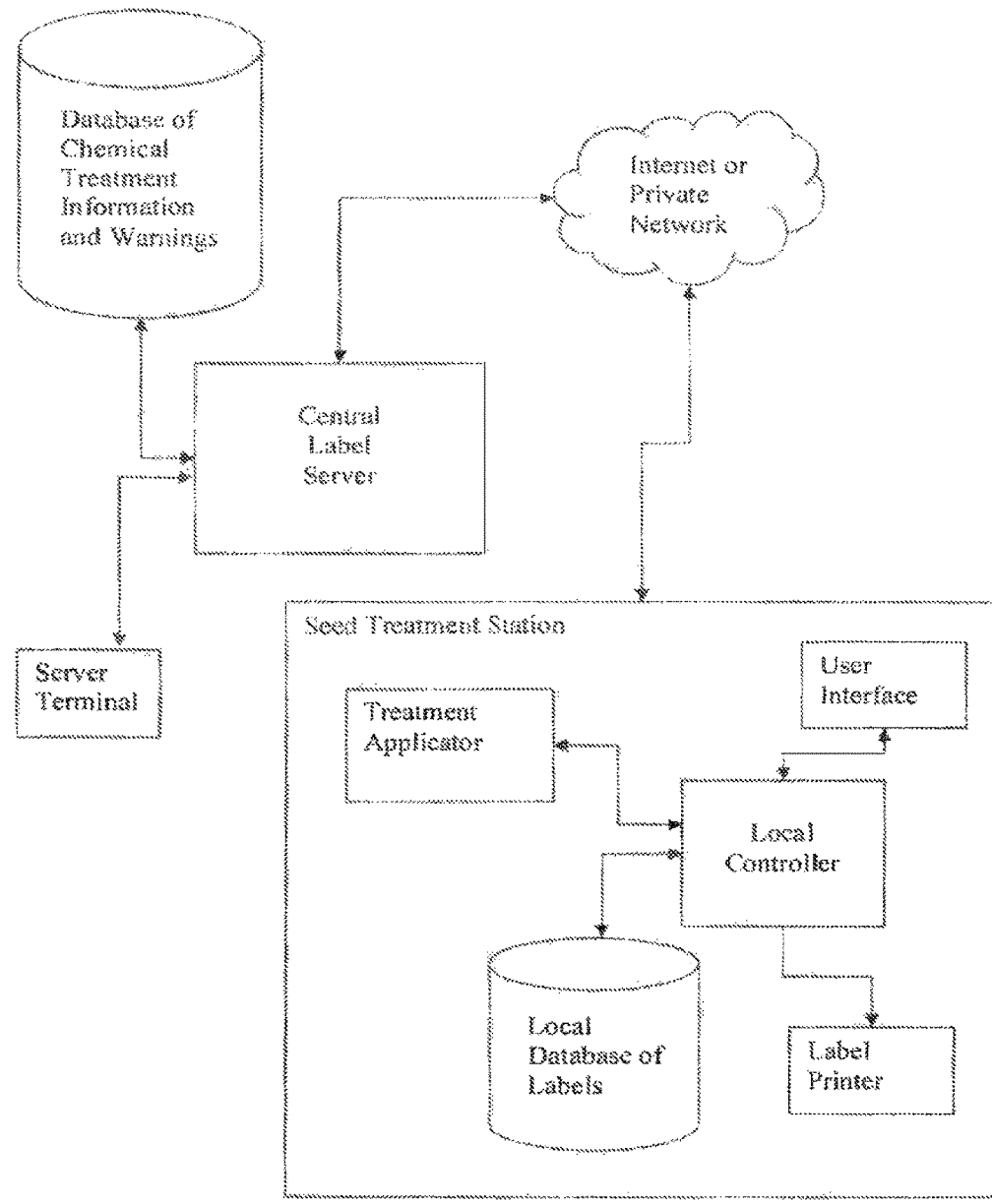
FIG. 15 depicts a high-level block diagram of warning label server and database coupled to a remote seed treatment station with a local database, according to an embodiment.

Referring to FIG. 15, an individual database of warning labels or individual component label information can be included with any one of the individual seed treatment stations. An individual seed treatment station can maintain a collection of commonly used seed treatment formulation labels in the local database and periodically contact a central label server that can maintain a database of chemical component treatment and warning information. In such a system the seed treatment station does not need to maintain a constant connection to the Internet or other network coupled to the central label server.

An individual seed treatment station can include a user interface, preferably a graphical user interface (GUI), optionally with a touch screen panel suitable for an industrial or retail environment. The GUI can include a plurality of screens that provide a user/operator with a variety of options, commands, and information necessary to operate and monitor the system, including the selection of individual component formulations and their corresponding informational or warning labels. After a user has selected a pre-programmed seed treatment formulation, or individually selected seed treatment components for a customized treatment formulation the local controller can direct a treatment applicator to treat the seeds as instructed by the user. At any time after the selection of a seed treatment formulation, either pre-programmed or customized, the local controller can interrogate the local database of labels or the central label server to retrieve and print an information or warning label that corresponds to the selected seed treatment formulation.

An information or warning label corresponds to an individual seed treatment formulation when the information displayed on the label includes the appropriate use, handling instructions, or warnings that are most pertinent to the individual seed treatment formulation. Typically, the warnings for the most toxic or chemical component, or the chemical component with the most restrictive handling instructions or precautions will be printed on the warning label for a seed treatment formulation with treatment components of varying toxicity.

Figure 16:
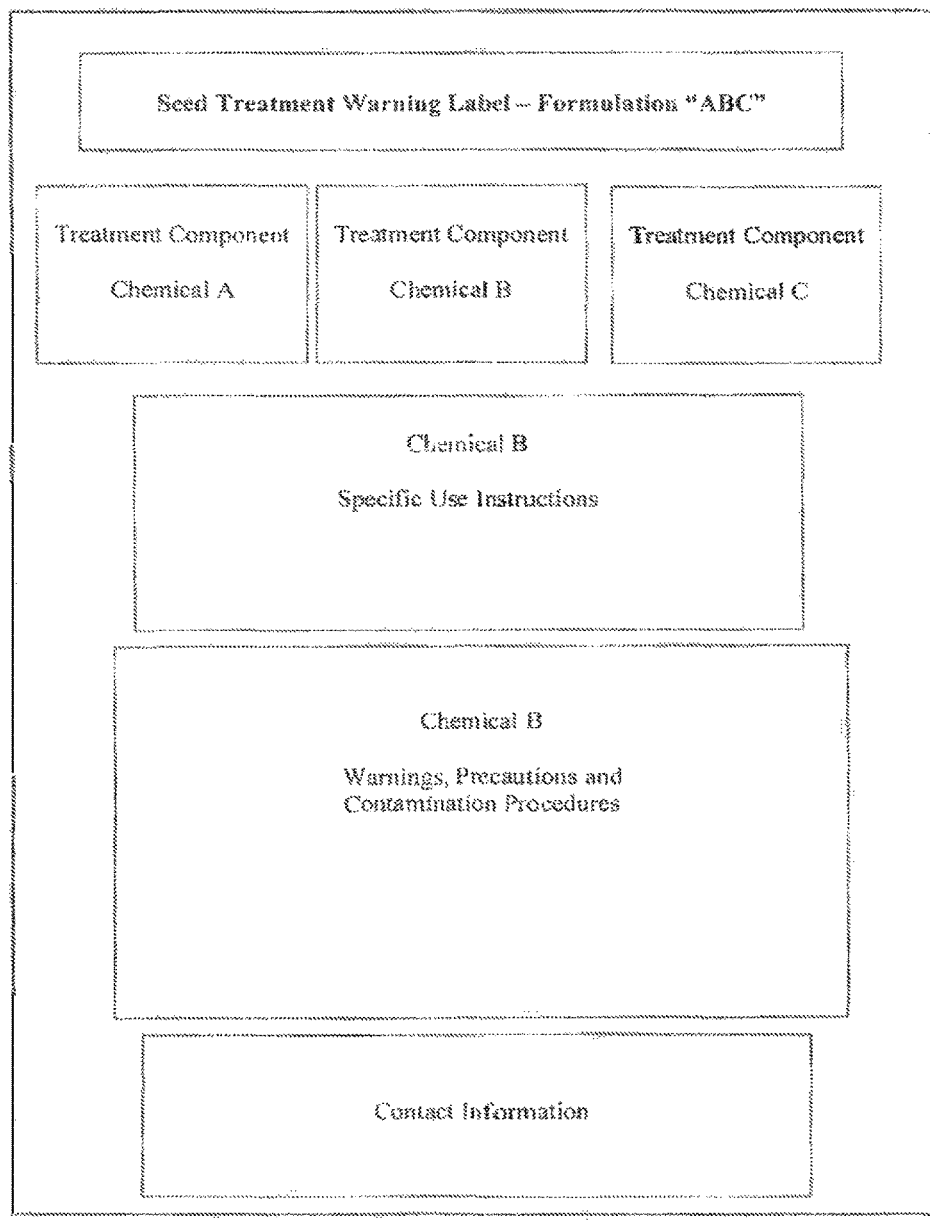
FIG. 16 depicts an exemplary embodiment of a seed-treatment component selection user-interface.

For example, if a seed treatment formulation includes three chemical components 'A', 'B', and 'C', where chemical component 'B' is the most toxic and has the most restrictive handling or use instructions, as depicted in FIG. 16, a warning label for seed treatment formulation "ABC" lists all three chemical components, but only include the use instructions, warnings, and contamination procedures for chemical component 'C'. In this manner, confusion regarding the proper handling and first aid procedures can be avoided by not labeling treated seeds with multiple sets of instructions for each individual chemical formulation. A typical seed treatment warning label also can include the chemical manufacturer's contact information, contact information for the seed treatment operator, or other information required by applicable laws, rules, or industry practice.

Figure 17:
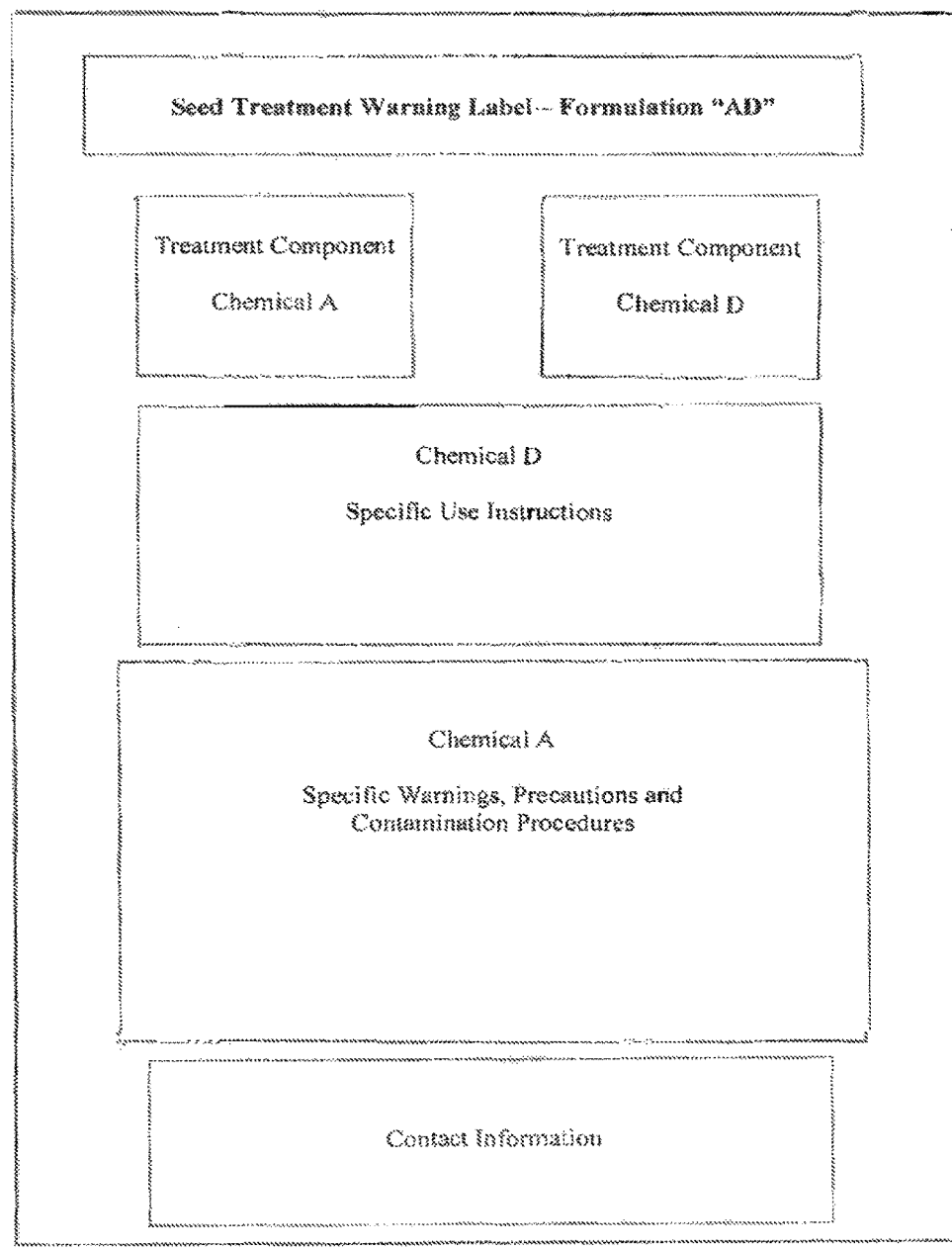
FIG. 17 depicts the selection of three seed treatment components in the user-interface of FIG. 16, according to an embodiment.

In a situation where a seed treatment formulation includes multiple chemical components that are generally equivalent in toxicity but vary in specific use, handling, or first aid instructions, the appropriate elements that yield the most safety conscious warning label can be generated. For example, as depicted in FIG. 17, if a seed treatment formulation includes two chemical components 'A' and 'D', where chemical component 'A' includes the most time-critical warnings or contamination instructions and chemical component 'D' has the most restrictive handling or use instructions, the resulting label of a treatment formulation "AD" would include the separate warnings or contamination instructions for chemical component 'A' and the handling or use instructions for chemical component 'D'.

Figure 18:
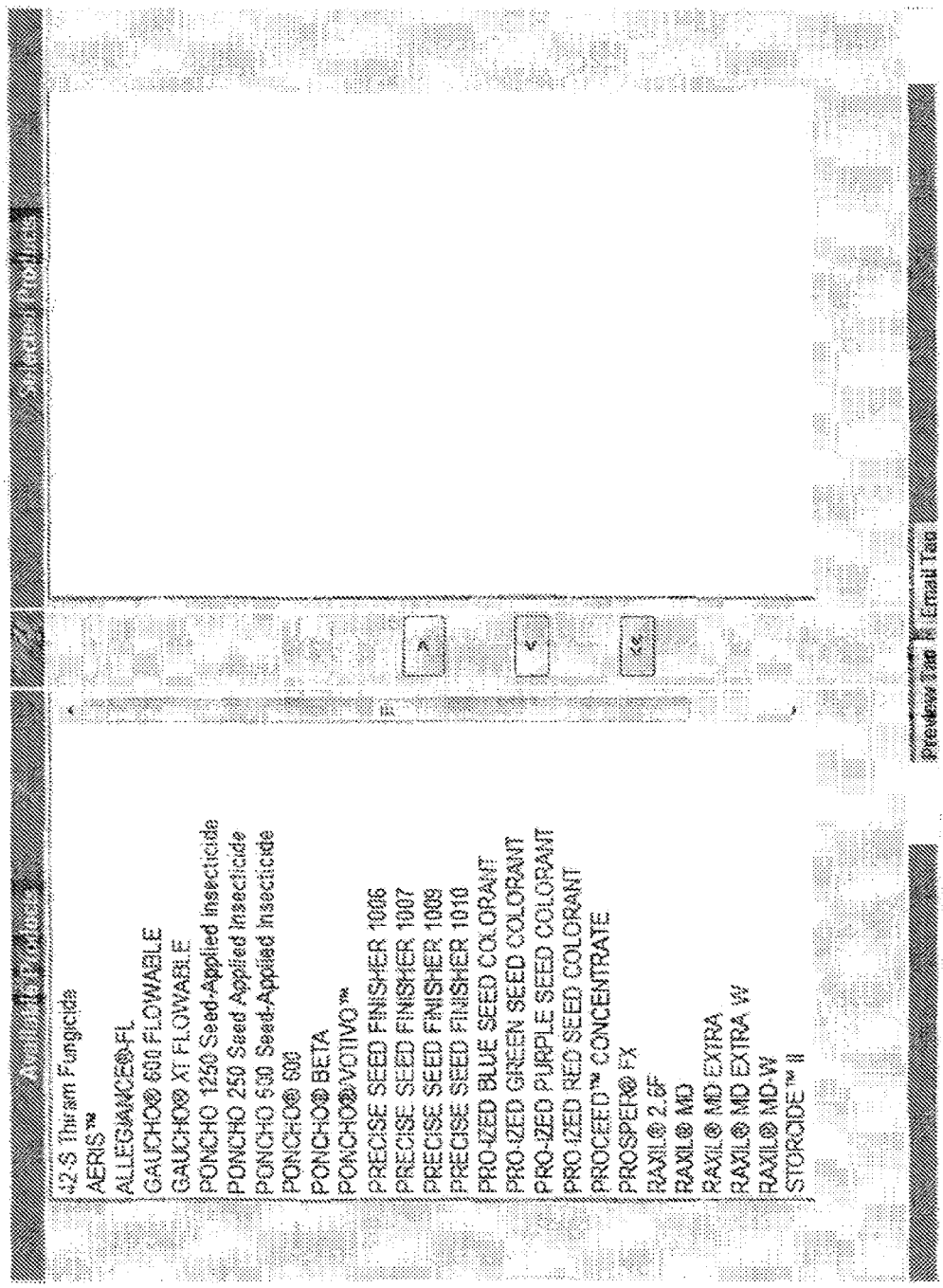
FIG. 18 depicts an exemplary embodiment of a customized seed treatment warning label.
Figure 19:
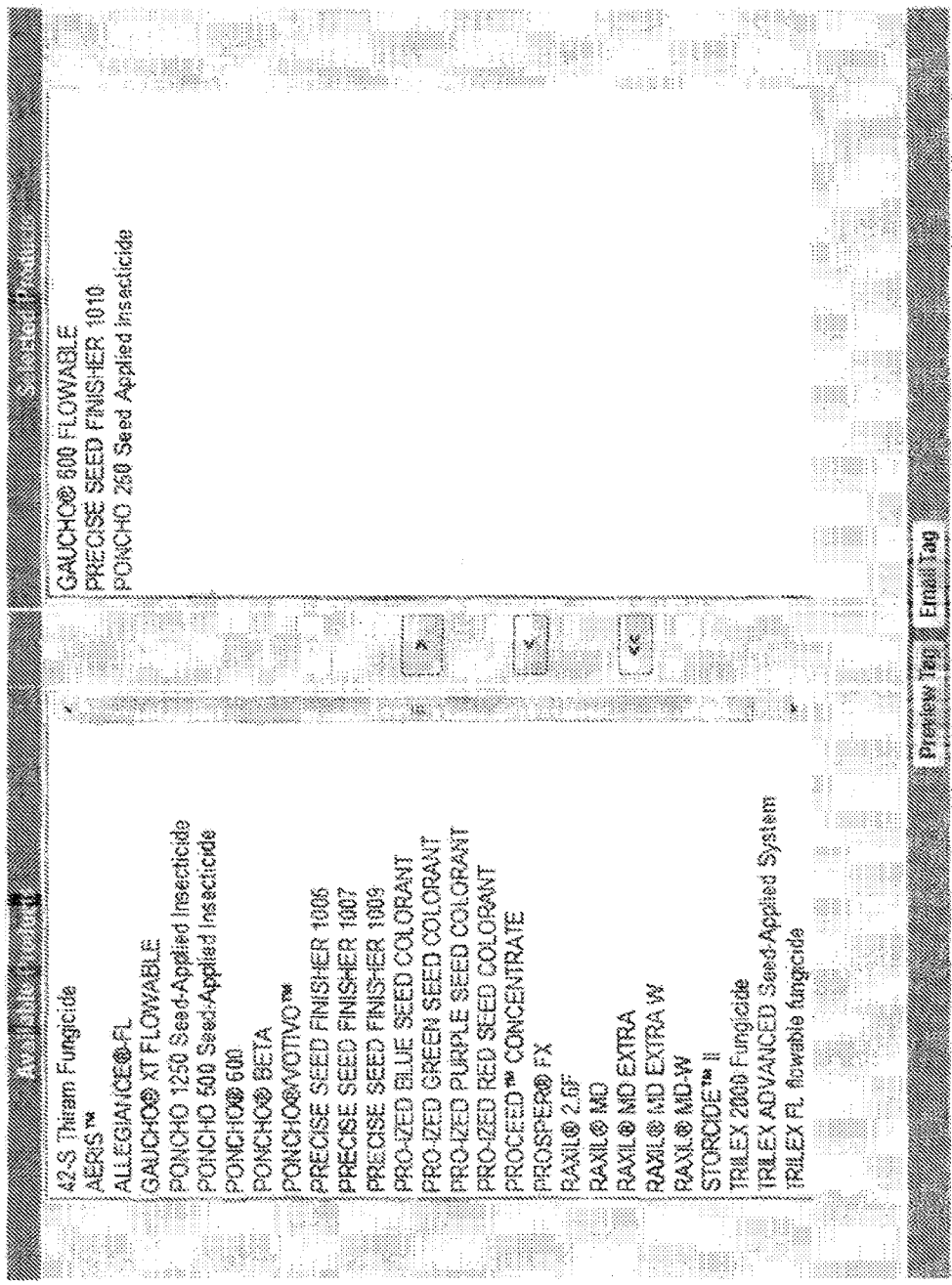
FIG. 19 depicts an exemplary embodiment of a customized seed treatment warning label.

Referring to FIGS. 18 and 19, a user terminal can also be communicatively coupled to a central label server and present a user with a plurality of component chemicals that can be selected as part of a chemical formulation. Once a user has selected one or more component chemicals for the chemical formulation, a computer processor can interrogate the centralized database and generate a label that includes the appropriate handling instructions and warnings for the chemical formulation based on the severity or priority of the individual chemical component's properties. A user can either select from options to preview a warning label, or tag, which would include the selected components, or e-mail the automatically generated tag to an e-mail recipient. After previewing an automatically generated label the label can be printed or saved for future reference.

In an embodiment, an on-demand seed treatment system is depicted generally in FIG. 20. The seed treatment system can include a system controller, a plurality of chemical stations each with a keg containing a chemical treatment, a pump and scale. The pump for each of the plurality of keg stations can provide chemical treatment from each keg to a seed-treatment application apparatus for immediate application of the chemicals to a batch of seeds. The system controller can be coupled to a user-interface such as a graphical touch-screen that can provided a user or operator of the seed treatment system with a variety of menus, alerts, data-entry fields, and other options to configure or operate the system. The system controller can be connected to a network, such as the Internet, a private corporate intranet, a cloud-based computer network, a cellular telephone network, or any of a variety of other electronic communication networks. The system controller can automatically generate warning labels, and print them from an attached label printer, during the treatment of a batch of seeds based on the warning data received over the network from a database of warning information maintained by the chemical manufacturing company or from a third-party with the authority or accepted responsibility to maintain a repository of treatment label warnings and instructions.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art. Embodiments of the present invention also have application in areas other than seed treatment, such as applications where a precise custom blending of liquid products are desired or required. For example, custom blending can be provided with an embodiment of the present invention, without being coupled to a seed treatment apparatus. A custom seed-treater, or a seed company entity, can utilize a recipe that calls for the blending of several components. The recipe can be transmitted over a network to an embodiment of the present invention, which in turn will precisely release materials from their respective kegs to a common receptacle, whereupon the components are collected to create the custom blended seed-treatment composition. At that or a later time, the custom blended seed treatment composition can be stored or transferred. When desired, the composition can be supplied in to the proper portion to an appropriate system. That system can be equipped to coat the seeds, whereupon the custom blended mixture is applied to the seeds, or some other appropriate use or application.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A method of treating seeds, the method comprising:
mixing a plurality of seed treatment components at a point of application according to a seed treatment recipe via a seed treatment system, wherein said seed treatment system comprises:
 (1) a seed-treater vessel configured to apply the plurality of seed treatment components to a batch of seeds based on the seed treatment recipe;
 (2) a plurality of pump-stations, wherein each pump station is configured to receive a keg, and each pump-station comprising a pump, a flow channel fluidly coupled to the seed-treater vessel, and a station controller configured to control the pump;
 (3) a plurality of kegs, each keg comprising:
  (a) a seed treatment component; and
  (b) a scale positioned underneath each keg;
 (4) at least one flex-tank coupled to a flex-tank pump and a pump controller configured to operate the flex-tank pump, and a scale positioned underneath the at least one flex-tank;
applying the mixture of seed treatment components to an unknown quantity of seeds;
determining the weight and density of each of the plurality of seed treatment components applied to the unknown quantity of seeds;
calculating a consumed volume for each of the plurality of seed treatment components applied to the unknown quantity of seeds upon completion of application of the mixture of seed treatment components; and
monitoring the consumption of each of the plurality of seed treatment components.

2. The method of claim 1, further comprising:
reporting the consumed volume of each of the plurality of seed treatment components to a computer database, the computer database being stored in a tangible computer readable medium.

3. The method of claim 1, further comprising:
calculating a volume of one or more seed treatment components necessary to treat the unknown quantity of seeds.

4. The method of claim 1, further comprising:
measuring an environmental condition at a seed treatment site; and
adjusting a rate of application of the mixture of seed treatment components in response to the environmental condition.

5. The method of claim 1, further comprising:
measuring a moisture content of the unknown quantity of seeds prior to treatment with the mixture of seed treatment components; and
adjusting a rate of application of the mixture of seed treatment components in response to the measured moisture content in the unknown quantity of seeds.

6. The method of claim 1, further comprising:
measuring a moisture content of the unknown quantity of seeds after the quantity of seed is treated with the mixture of seed treatment components; and
adjusting a rate of application of the mixture of seed treatment components in response to the measured moisture content in the unknown quantity of seeds.

7. The method of claim 1, further comprising:
measuring a moisture content of the unknown quantity of seeds prior to treatment with the mixture of seed treatment components; and
injecting water from an external source into the mixture of seed treatment components in response to the moisture content in the unknown quantity of seeds.

8. The method of claim 1, further comprising:
adjusting a treatment rate to accommodate a variance in performance of treatment apparatus.

9. The method of claim 1, further comprising:
notifying a station controller of movement that causes a scale to provide an inaccurate reading.

10. The method of claim 1, further comprising:
collecting operational data representing at least consumption of each of the plurality of seed treatment components,
providing the operational data to a remotely hosted information system located remotely from the retail seed distribution site, and
receiving a re-supply of seed treatment components from a third party sent in response to the providing of the operational data to the remotely hosted information system.

11. The method of claim 10, wherein the operational data includes information representing a pump performance.

12. The method of claim 10, wherein the operational data includes material consumption information representing a quantity of treated seed.

13. The method of claim 10, further comprising:
receiving the seed treatment recipe from the remotely hosted information system.

14. The method of claim 10, further comprising:
receiving, from the remotely hosted information system, constraint information containing limits on chemical formulations; and
applying the constraint information to limit whether certain recipes can be run.

15. The method of claim 4, wherein the environmental condition comprises ambient temperature.

16. The method of claim 4, wherein the environmental condition comprises atmospheric pressure.

17. The method of claim 4, wherein the environmental condition comprises relative humidity.

18. The method of claim 1, wherein said seed treatment system further comprises:
(5) a programmable system controller configured to receive a transfer indication from each station controller of the plurality of pump stations.

19. The method of claim 18, wherein each one of the station controllers of the plurality of pump stations is programmed to send the transfer indication to the programmable system controller and to receive control commands from the programmable system controller.

* * * * *